United States Patent
Hiramoto

(10) Patent No.: US 9,485,370 B2
(45) Date of Patent: Nov. 1, 2016

(54) DEVICE FOR DISPLAY CONTROL OVER SETTINGS OBJECT, METHOD FOR DISPLAYING SETTINGS OBJECT, AND COMPUTER-READABLE STORAGE MEDIUM FOR COMPUTER PROGRAM

(71) Applicant: Konica Minolta, Inc., Chiyoda-ku, Tokyo (JP)

(72) Inventor: Hirotsugu Hiramoto, Kobe (JP)

(73) Assignee: KONICA MINOLTA INC., Tokyo (JP)

(*) Notice: Subject to any disclaimer, the term of this patent is extended or adjusted under 35 U.S.C. 154(b) by 0 days.

(21) Appl. No.: 14/514,843

(22) Filed: Oct. 15, 2014

(65) Prior Publication Data

US 2015/0109630 A1 Apr. 23, 2015

(30) Foreign Application Priority Data

Oct. 17, 2013 (JP) ................................. 2013-216322

(51) Int. Cl.
| | |
|---|---|
| G06F 3/12 | (2006.01) |
| H04N 1/00 | (2006.01) |
| G06K 15/00 | (2006.01) |
| G03G 15/00 | (2006.01) |
| G06F 3/0482 | (2013.01) |
| G06F 3/0484 | (2013.01) |

(52) U.S. Cl.
CPC ........ *H04N 1/00413* (2013.01); *G03G 15/502* (2013.01); *G06K 15/005* (2013.01); *H04N 1/00411* (2013.01); *H04N 1/00416* (2013.01); *H04N 1/00424* (2013.01); *H04N 1/00482* (2013.01); *G03G 15/5016* (2013.01); *G06F 3/0482* (2013.01); *G06F 3/04847* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 2003/0197735 A1* | 10/2003 | Woltzen | G06F 17/30893 715/777 |
| 2008/0184156 A1 | 7/2008 | Sato | |
| 2009/0323101 A1 | 12/2009 | Saito | |
| 2010/0199210 A1* | 8/2010 | Harada | G06F 3/0483 715/777 |
| 2012/0281245 A1* | 11/2012 | Mitsui | G06F 9/4411 358/1.13 |

FOREIGN PATENT DOCUMENTS

| | | |
|---|---|---|
| JP | 2010-9297 A | 1/2010 |
| JP | 2010-165300 A | 7/2010 |

OTHER PUBLICATIONS

Extended European Search Report corresponding to Application No. 14188090.6-1972/2863266; Date of Mailing: Mar. 25, 2015.

* cited by examiner

*Primary Examiner* — Marivelisse Santiago Cordero
*Assistant Examiner* — Neil R McLean
(74) *Attorney, Agent, or Firm* — Cantor Colburn LLP

(57) ABSTRACT

A device is provided which displays objects provided on an item by item basis of conditions of processing. The device includes a storage portion configured to store data therein, the data indicating specific objects belonging to a custom group, and indicating child specific objects belonging to a subordinate group lower than the custom group; an update portion configured to update the data in such a manner that the specific object designated belongs to the subordinate group and configured to update the data in such a manner that the child specific object designated is withdrawn from the subordinate group; and a display control portion configured to display a first screen in which a specific object not belonging to the subordinate group, and a call object are provided, and configured to display when operation is made on the call object, a second screen in which the child specific objects are provided.

21 Claims, 34 Drawing Sheets

FIG. 6
OBJECT CODE : JT003
NAME : PRINT TYPE
TYPE : PULL-DOWN LIST
OPTIONS :  2-SIDED
 1-SIDED

FIG. 7

| OBJECT CODE | DATE/TIME FOR ADDITION | DATE/TIME FOR SETTINGS CHANGE |
|---|---|---|
| JT001 | 2013/01/02 03:45 | 2013/02/11 21:21 — 6N1 (6N) |
| JT002 | 2012/12/31 15:45 | 2012/04/08 11:11 — 6N2 (6N) |
| JT003 | 2013/03/03 03:33 | 2013/03/13 13:37 — 6N3 (6N) |
| ... | ... | ... |

FIG. 17

```
PRINT TYPE
PAGE COMBINE
STATUS
ZOOM
+PAPER
    PAPER FEED TRAY
    PAPER TYPE
    +PROCESSING
        STAMP
```
5BM1

FIG. 25

```
           OBJECT CODE: JT701
                  NAME: BLANK SHEET INHIBIT
                  TYPE: CHECK BOX
  CONFLICT OBJECT CODE: JT711
```
                            6J

FIG. 26

"BLANK SHEET INHIBIT" AND "CHAPTER DIVISION" HAVE
A CONFLICT WITH EACH OTHER.

• IN ORDER TO USE "BLANK SHEET INHIBIT",
  IT IS NECESSARY TO TURN "CHAPTER DIVISION" OFF.

• DURING THE USE OF "CHAPTER DIVISION",
  "BLANK SHEET INHIBIT" IS NOT AVAILABLE.

DO YOU INTEND TO MOVE THESE ITEMS CONCURRENTLY ?

YES    NO

5HB1    5HB2    5H

DEVICE FOR DISPLAY CONTROL OVER SETTINGS OBJECT, METHOD FOR DISPLAYING SETTINGS OBJECT, AND COMPUTER-READABLE STORAGE MEDIUM FOR COMPUTER PROGRAM

This application is based on Japanese patent application No. 2013-216322 filed on Oct. 17, 2013, the contents of which are hereby incorporated by reference.

BACKGROUND OF THE INVENTION

1. Field of the Invention

The present invention relates to display for conditions setting in a device.

2. Description of the Related Art

Printers have recently grown in performance and increased in functionality. This increases items of conditions to be set for carrying out printing (such items hereinafter referred to as "setting items"), and also increases the number of objects (text box, pull-down list, and combo box, for example) provided on a screen where conditions are set up. In addition to the printers, some devices have similar circumstances.

There has been proposed a method for classifying setting items into groups, providing a tab for each group, and switching, through the tabs, between objects for setting items to be displayed at one time. Another method has been proposed. According to the method, any setting item is added to a variable group depending on the preference of a user, and a tab is provided for the variable group. When the tab is pressed, objects for setting items of the variable group are displayed at one time (Japanese Laid-open Patent Publication No. 2010-165300).

Further, as a method for reducing incorrect setting, the following method has been proposed. When selection is changed in a selection setting item, a sub setting screen having an association setting item associated with the selection setting item is newly displayed (English abstract of Japanese Laid-open Patent Publication No. 2010-009297).

According to the technology described in Japanese Laid-open Patent Publication No. 2010-165300, the user can find out, from many setting items, important one or frequently-used one more easily than with conventionally possible.

However, as the number of setting items of the variable group increases, it is more difficult for the user to find out a desired one from among the objects for the setting items.

The present invention has been achieved in light of such an issue, and an object thereof is to display an object for a setting item arbitrarily selected by a user more clearly than with conventionally possible.

SUMMARY

According to one aspect of the present invention, a settings object display control device for displaying, on a display unit, objects provided on an item by item basis of conditions to be set for processing and used for a user to set conditions for the item, includes a storage portion configured to store member data therein, the member data indicating, among the objects, specific objects belonging to a custom group whose member is selectable arbitrarily by the user, and indicating, among the specific objects, child specific objects belonging to a subordinate group lower than the custom group; an update portion configured to update, when any one of the specific objects is designated and when predetermined operation is performed, the member data in such a manner that the specific object designated belongs to the subordinate group, and configured to update, when any one of the child specific objects is designated and when predetermined operation is performed, the member data in such a manner that the child specific object designated is withdrawn from the subordinate group; and a setting screen display control portion configured to display, on the display unit, a first setting screen in which, among the specific objects, a specific object not belonging to the subordinate group, and a call object are provided based on the member data, and configured to display, on the display unit, when operation is made on the call object, a second setting screen in which the child specific objects are provided.

According to another aspect of the present invention, a settings object display control device for displaying, on a display unit, objects provided on an item by item basis of conditions to be set for processing and used for a user to set conditions for the item, includes a storage portion configured to store member data therein, the member data indicating, among the objects, specific objects belonging to a custom group whose member is selectable arbitrarily by the user, and indicating, among the specific objects, child specific objects belonging to a subordinate group lower than the custom group; an update portion configured to update, when any one of the specific objects is designated and when predetermined operation is performed, the member data in such a manner that the specific object designated and a specific object for another item to be set together with the item for the specific object designated belongs to the subordinate group; and a setting screen display control portion configured to display, on the display unit, a first setting screen in which, among the specific objects, a specific object not belonging to the subordinate group, and a call object are provided based on the member data, and configured to display, on the display unit, when operation is made on the call object, a second setting screen in which the child specific objects are provided.

These and other characteristics and objects of the present invention will become more apparent by the following descriptions of preferred embodiments with reference to drawings.

BRIEF DESCRIPTION OF THE DRAWINGS

FIG. 6 is a diagram showing an example of object data.

FIG. 7 is a diagram showing an example of date/time data.

FIG. 17 is a diagram showing an example of a state of a left-side member list after a name of a call object is changed.

FIG. 25 is a diagram showing an example of object data on a setting item having a conflict with another setting item.

FIG. 26 is a diagram showing an example of an addition necessity designation screen.

DESCRIPTION OF THE PREFERRED EMBODIMENTS

Figure 1:
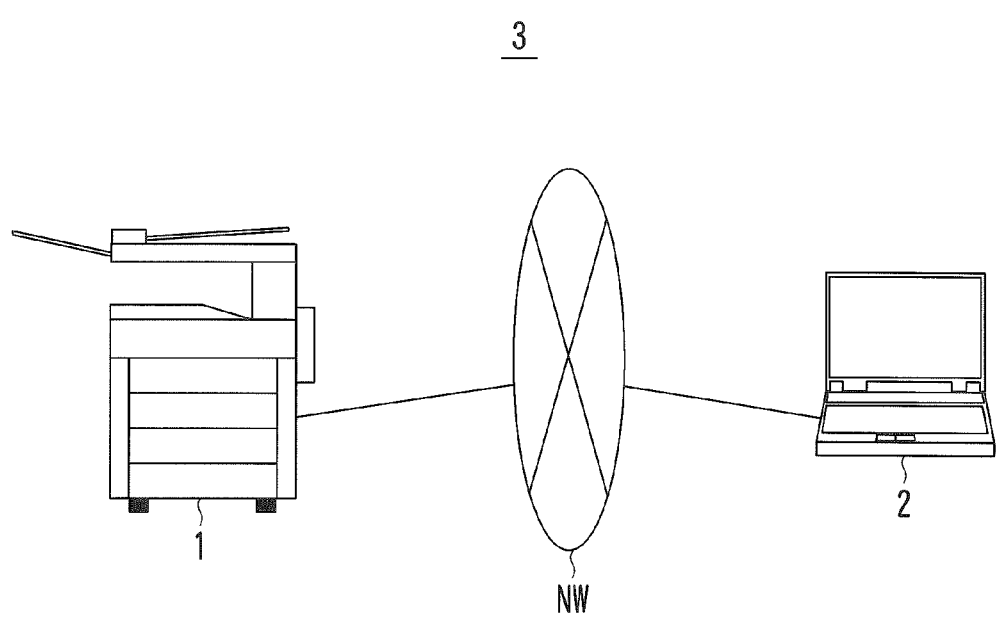
FIG. 1 is a diagram showing an example of the overall configuration of a print system.
Figure 2:
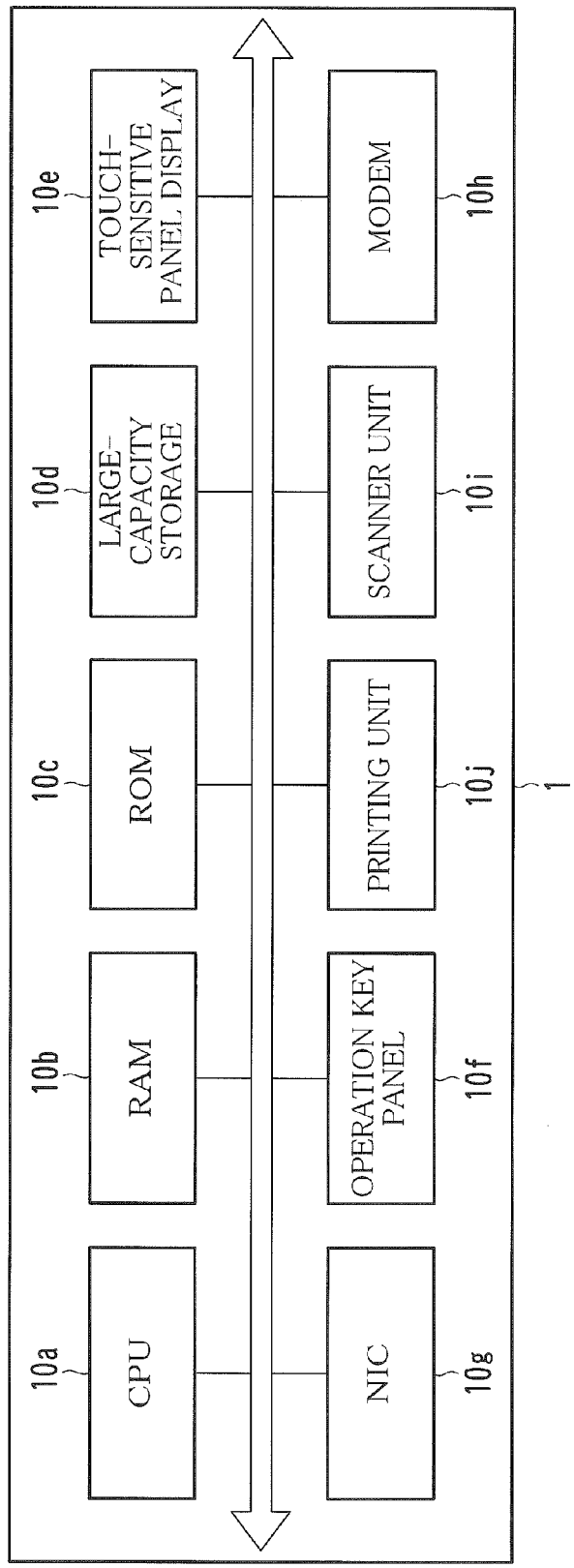
FIG. 2 is a diagram showing an example of the hardware configuration of an image forming apparatus.
Figure 3:
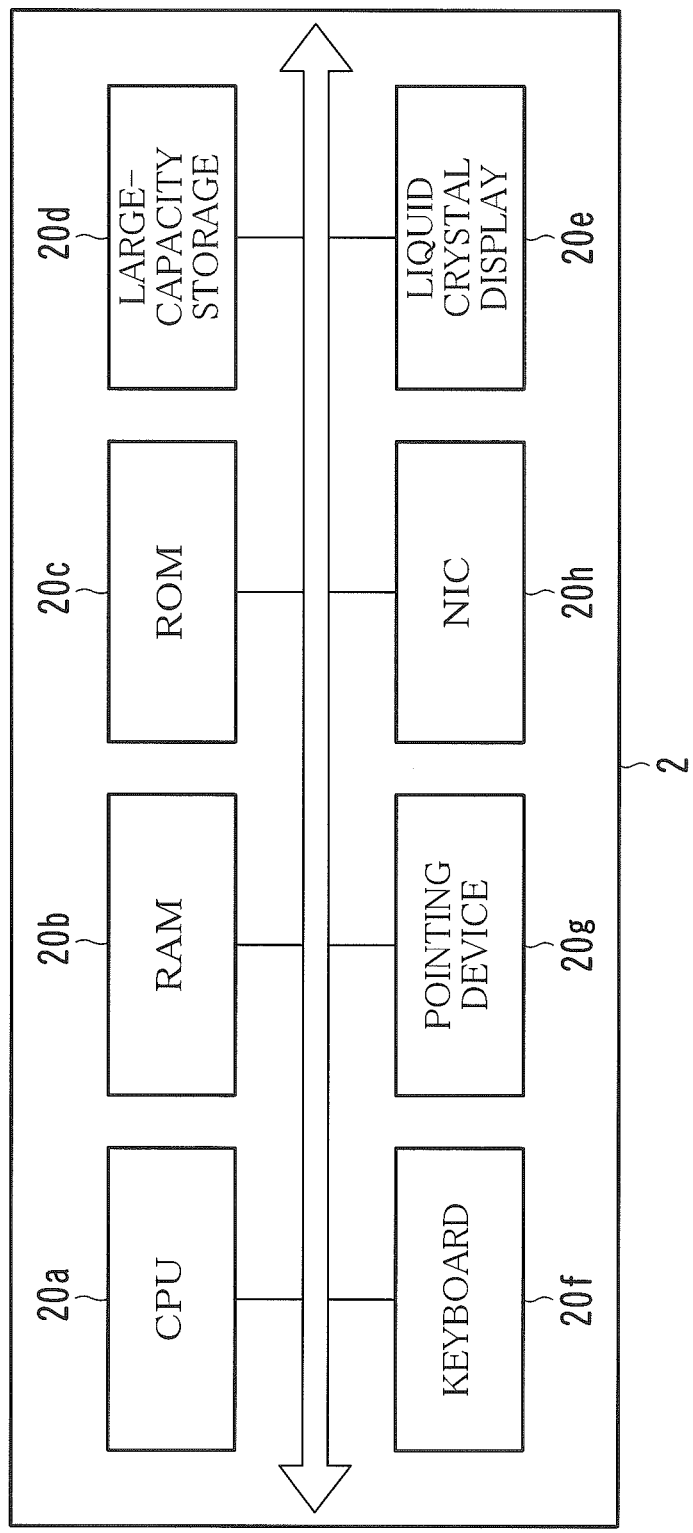
FIG. 3 is a diagram showing an example of the hardware configuration of a terminal.
Figure 4:
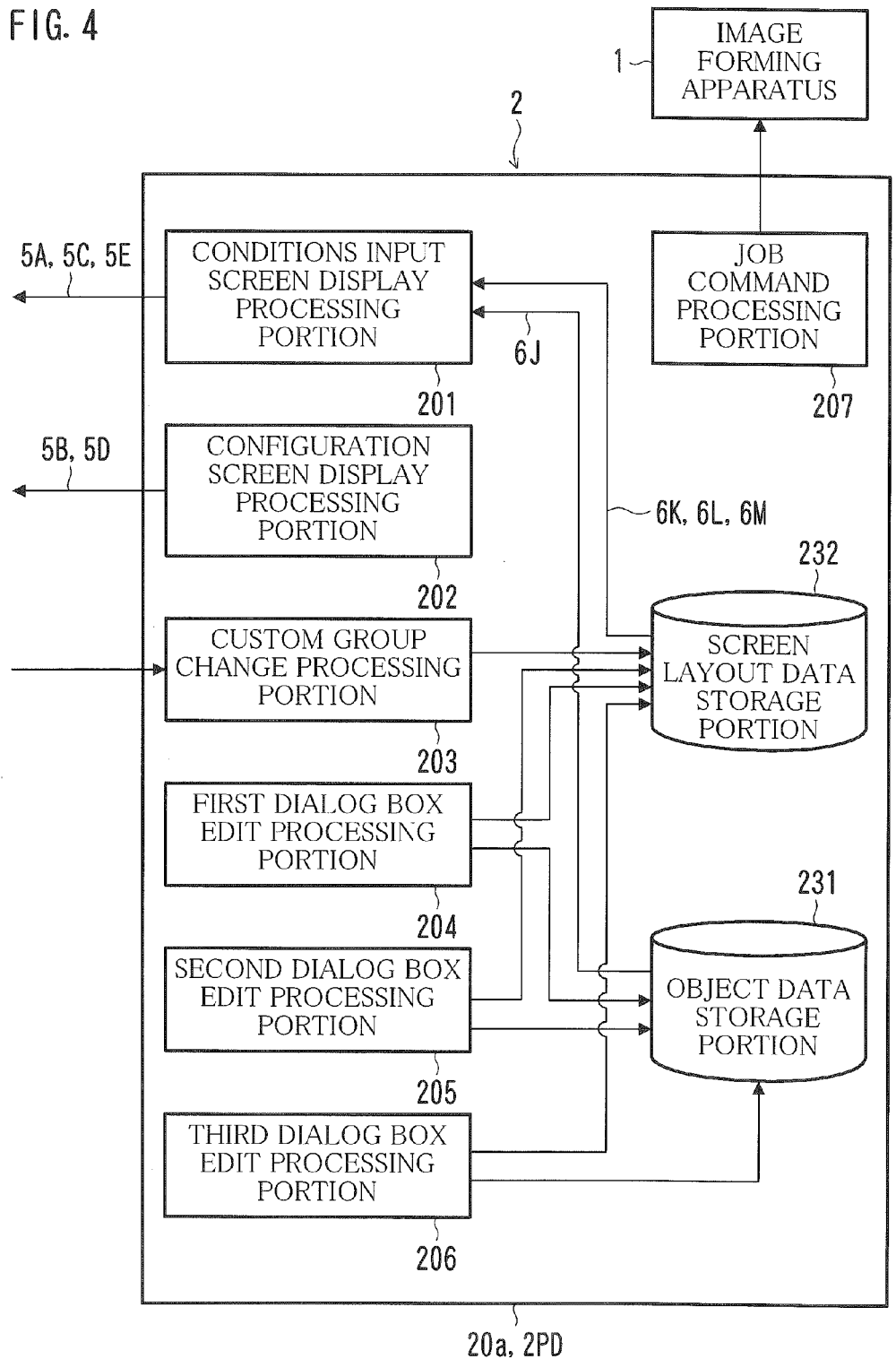
FIG. 4 is a diagram showing an example of the functional configuration of a terminal.

FIG. 1 is a diagram showing an example of the overall configuration of a print system 3. FIG. 2 is a diagram showing an example of the hardware configuration of an image forming apparatus 1. FIG. 3 is a diagram showing an example of the hardware configuration of a terminal 2. FIG. 4 is a diagram showing an example of the functional configuration of the terminal 2.

Referring to FIG. 1, the print system 3 is configured of the image forming apparatus 1, the terminal 2, a communication line NW, and so on. The image forming apparatus 1 and the terminal 2 are configured to perform communication with each other via the communication line NW. Examples of the communication line NW are a so-called Local Area Network (LAN), the Internet, a public line, and a dedicated line.

The image forming apparatus 1 is an apparatus into which functions such as copying, PC printing, faxing, and scanning, are consolidated. The image forming apparatus 1 is usually called a "multifunction device" or a "Multi-Functional Peripheral (MFP)".

The PC printing function is to print an image onto paper based on image data received from the terminal 2. The PC printing function is sometimes called "network printing" or "network print".

Referring to FIG. 2, the image forming apparatus 1 is configured of a Central Processing Unit (CPU) 10a, a Random Access Memory (RAM) 10b, a Read Only Memory (ROM) 10c, a large-capacity storage 10d, a touch-sensitive panel display 10e, an operation key panel 10f, a Network Interface Card (NIC) 10g, a modem 10h, a scanner unit 10i, a printing unit 10j, and so on.

The touch-sensitive panel display 10e displays, for example, a screen for presenting messages to a user, a screen for allowing the user to input commands or information, a screen for showing the results of processing executed by the CPU 10a, and so on. The touch-sensitive panel display be sends a signal indicating a touched position to the CPU 10a.

The operation key panel 10f is a so-called hardware keyboard, and is provided with a numeric keypad, a start key, a stop key, and a function key.

The NIC 10g performs communication with the terminal 2 in accordance with a protocol such as Transmission Control Protocol/Internet Protocol (TCP/IP).

The modem 10h sends and receives image data with a facsimile terminal in accordance with a protocol such as G3.

The scanner unit 10i optically reads an image recorded on a sheet of paper placed on a platen glass to generate image data thereof.

The printing unit 10j prints, onto paper, an image captured by the scanner unit 10i and an image received from other devices by the NIC 10g or the modem 10h.

The ROM 10c or the large-capacity storage 10d stores, therein, programs for implementing the foregoing functions such as copying. The programs are loaded into the RAM 10b as necessary and executed by the CPU 10a. Examples of the large-capacity storage 10d are a hard disk or a Solid State Drive (SSD).

The terminal 2 is a client of the image forming apparatus 1. The user operates the terminal 2 to use the variety of functions of the image forming apparatus 1 remotely. Examples of the terminal 2 are a laptop computer, a desktop computer, a smartphone, and a tablet computer. Hereinafter, a case is described in which the terminal 2 is a laptop computer.

Referring to FIG. 3, the terminal 2 is configured of a CPU 20a, a RAM 20b, a ROM 20c, a large-capacity storage 20d, a liquid crystal display 20e, a keyboard 20f, a pointing device 20g, an NIC 20h, and so on.

The liquid crystal display 20e displays, for example, a screen for presenting messages to the user, a screen for allowing the user to input commands or information, a screen for showing the results of processing executed by the CPU 20a, and so on. In particular, the liquid crystal display 20e displays, for example, a conditions input screen 5A (see FIG. 5), a configuration screen 5B (see FIG. 10), and a dialog box 5C (see FIG. 14), all of which are described later.

The keyboard 20f and the pointing device 20g are input devices for the user to enter information and commands. The NIC 20h serves to perform communication with the image forming apparatus 1 in accordance with a protocol such as TCP/IP.

The ROM 20c or the large-capacity storage 20d stores, therein, an operating system, a variety of applications, and a printer driver 2PD. The programs are loaded into the RAM 20b as necessary and executed by the CPU 20a.

The printer driver 2PD is a program for controlling the image forming apparatus 1 to perform print processing or processing for applying a finish to a printed matter. The printer driver 2PD is characterized, particularly, by customizing a screen used to designate conditions for the processing.

The printer driver 2PD implements the functions of a conditions input screen display processing portion 201, a configuration screen display processing portion 202, a custom group change processing portion 203, a first dialog box edit processing portion 204, a second dialog box edit processing portion 205, a third dialog box edit processing portion 206, a job command processing portion 207, an object data storage portion 231, a screen layout data storage portion 232, a date/time data storage portion 233, and so on, all of which are shown in FIG. 4. The functions will be described in order.

[Outline of Each Portion]

Figure 5:
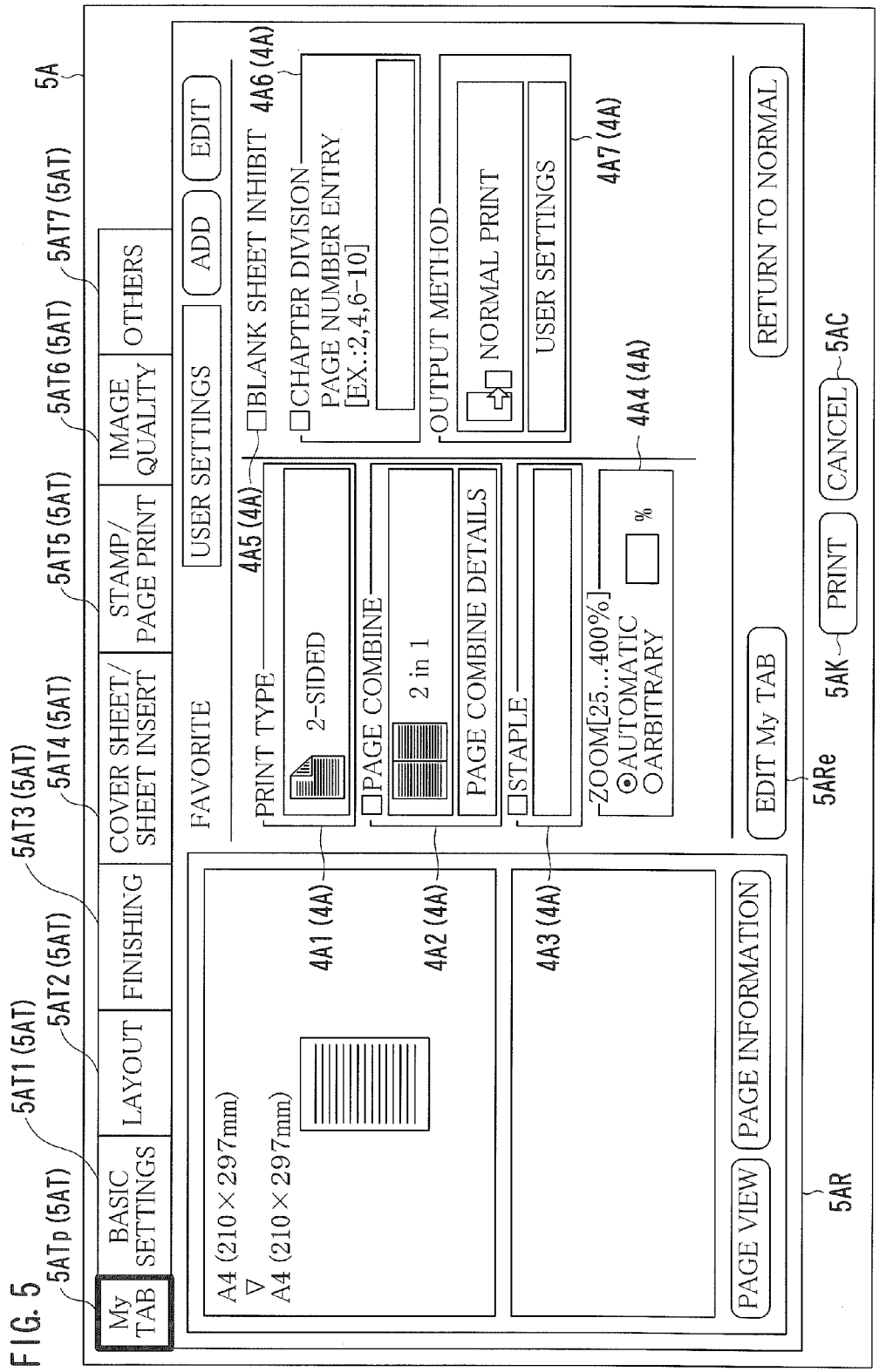
FIG. 5 is a diagram showing an example of a conditions input screen.

FIG. 5 shows an example of a conditions input screen 5A. FIG. 6 shows an example of object data 6J. FIG. 7 shows an example of date/time data 6N.

The conditions input screen display processing portion 201 performs processing for displaying the conditions input screen 5A on the liquid crystal display 20e. The conditions input screen 5A is an example of a first setting screen according to the present invention.

The conditions input screen 5A is a screen for the user to designate conditions for a job which is to be executed by the image forming apparatus 1. As shown in FIG. 5, the conditions input screen 5A includes a plurality of tabs 5AT, a conditions designation region 5AR, a print button 5AK, and a cancel button 5AC.

Various items for conditions to be set for printing or finishing are classified into a plurality of groups. Such items are hereinafter referred to as "setting items". The tabs 5AT are provided on a group-by-group basis. When any one of the tabs 5AT is selected, the selected tab 5AT is treated as a target tab. Objects used to designate conditions for each setting item of the group corresponding to the target tab are placed in the conditions designation region 5AR. Such an object is usually called a "control". The target tab is shown by a thick frame in the drawings.

Hereinafter, an object to designate conditions for a setting item is sometimes referred to as a "settings object 4A" so as to be distinguished from an object for another purpose. Each of the objects including such a settings object 4A is given a unique object code.

Examples of the settings object 4A include different kinds of objects of a text box, pull-down list, combo box, button (ordinary button), check box, radio button, and list box. As the settings object 4A, some of the different kinds of objects are sometimes used in combination. Hereinafter, the settings objects 4A may be described separately as a "settings object 4A1", a "settings object 4A2", and so on.

The user is allowed to select, in advance, any one or more of the setting items to place, at one time, the settings objects 4A for the selected setting items in the conditions designation region 5AR. Hereinafter, a group of the selected setting items is particularly referred to as a "custom group".

One tab 5AT is provided for one custom group. Hereinafter, the tab 5AT may be particularly referred to as a "custom tab 5ATp". Further, the tabs 5AT other than the custom tab 5ATp may be described separately as a "tab 5AT1", a "tab 5AT2", and so on.

The conditions input screen display processing portion 201 displays, as another conditions input screen, not only the conditions input screen 5A but the dialog box 5C (see FIG. 14) described later.

The configuration screen display processing portion 202 performs processing for displaying the configuration screen 5B on the liquid crystal display 20e. The configuration screen 5B is a screen for the user to edit a custom group. On the configuration screen 5B, the user is allowed to add a setting item as a member of the custom group, delete a setting item from members of the custom group, and change the layout of members of the custom group. The configuration screen display processing portion 202 further displays a name change screen 5D (see FIG. 16) as a screen on which a custom group is edited. The configuration screen 5B is an example of an edit screen according to the present invention.

The custom group change processing portion 203 performs processing for changing the structure of the custom group in accordance with the operation by the user on the configuration screen 5B.

In the meantime, the user is allowed to make a subordinate group (small group) of all or some of the members of the custom group, and to display the small group on a screen different from the configuration screen 5B. Hereinafter, a case is described in which the small group is displayed on a screen, e.g., the dialog box 5C (see FIG. 14). The dialog box 5C is an example of a second setting screen according to the present invention.

All of the first dialog box edit processing portion 204, the second dialog box edit processing portion 205, and the third dialog box edit processing portion 206 perform processing for editing the dialog box 5C.

When the print button 5AK is pressed, the job command processing portion 207 performs processing for instructing the image forming apparatus 1 to execute a print job based on the details of the operation by the user on the conditions input screen 5A.

The object data storage portion 231 stores, in advance, the object data 6J on an object-by-object basis.

The object data 6J indicates an object code, name and type of the object. For example, the object data 6J on settings object 4Aa indicates the details as shown in FIG. 6. Depending on the type of the object, options are shown in some cases. The object data 6J also indicates processing to be executed in response to operation performed on the object. The processing is, for example, to open a specific screen, reset the input details, close the current screen, or send a command to another device. As the name of the settings object 4A, the name of the setting item corresponding to the settings object 4A is used.

Meanwhile, setting a value (condition value) on an object involves a change to a value of another object in some cases. Stated differently, a value of an object is sometimes incompatible with a value of another object. Such a relationship is hereinafter referred to as a "conflict".

The object data 6J on an object having such a conflict with another object indicates an object code of the other object as a conflict object code.

The screen layout data storage portion 232 stores, in advance, screen layout data 6K on a group-by-group basis. The screen layout data 6K indicates the position of each object in the conditions designation region 5AR (see FIG. 9).

In particular, the screen layout data 6K for a custom group is updated in accordance with the operation by the user on the configuration screen 5B. The screen layout data storage portion 232 further stores layout data for the dialog box 5C (see FIG. 14) described later.

As shown in FIG. 7, the date/time data storage portion 233 stores date/time data 6N (6N1, 6N2, . . . , and so on) for each settings object 4A. The date/time data 6N indicates an object code, date/time for addition, and date/time for settings change. The "date/time for addition" is a date/time at which the settings object 4A was added to the custom group. When the settings object 4A does not belong to the custom group, the date/time data 6N indicates no date/time for addition. The "date/time for settings change" is a date/time at which the settings object 4A was used last on the conditions input screen 5A to change the conditions. If no change was made to conditions for a setting item related to the settings object 4A, the date/time data 6N shows no date/time for settings change.

The description goes on to the further details of the processing by the individual portions of the terminal 2 shown in FIG. 4 and the operation by the user.

[Display of Conditions Input Screen 5A and Editing of Custom Group]

Figure 8:
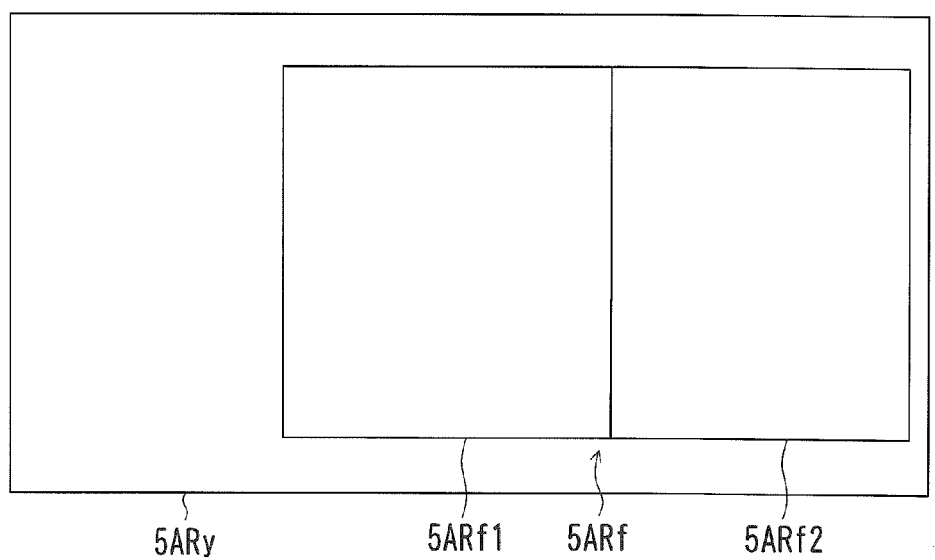
FIG. 8 is a diagram showing an example of a layout of a conditions designation region.
Figure 9:
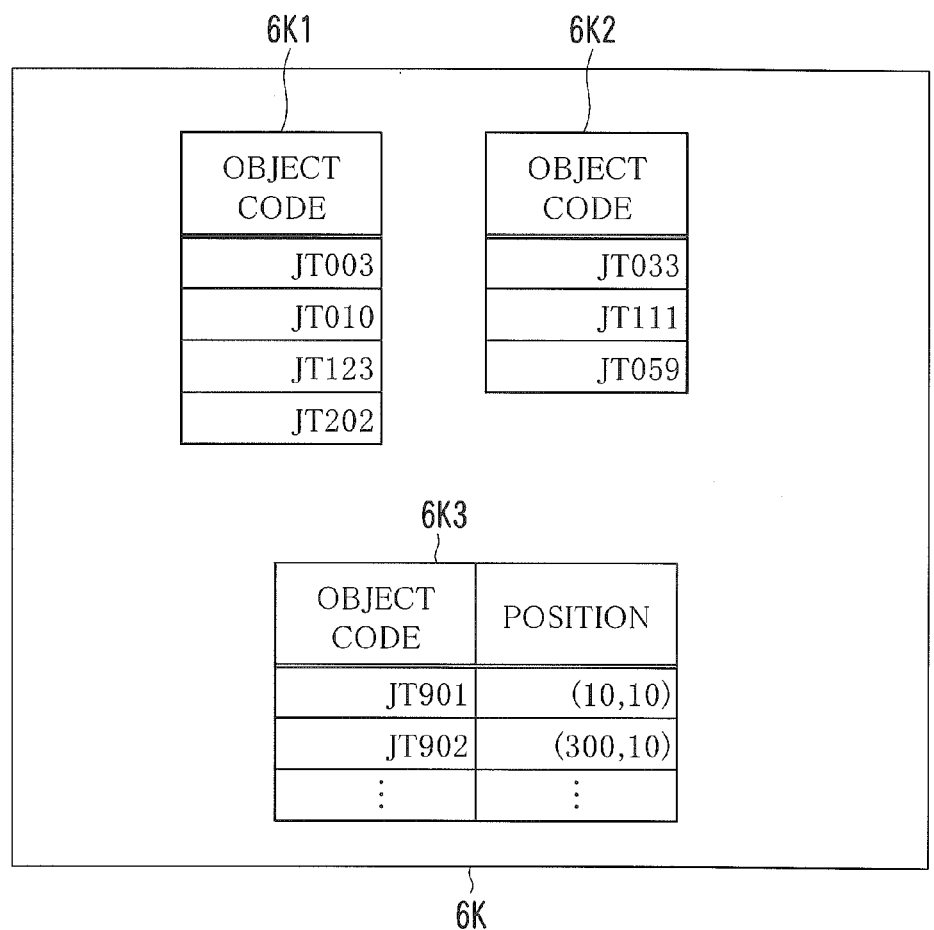
FIG. 9 is a diagram showing an example of screen layout data.
Figure 10:
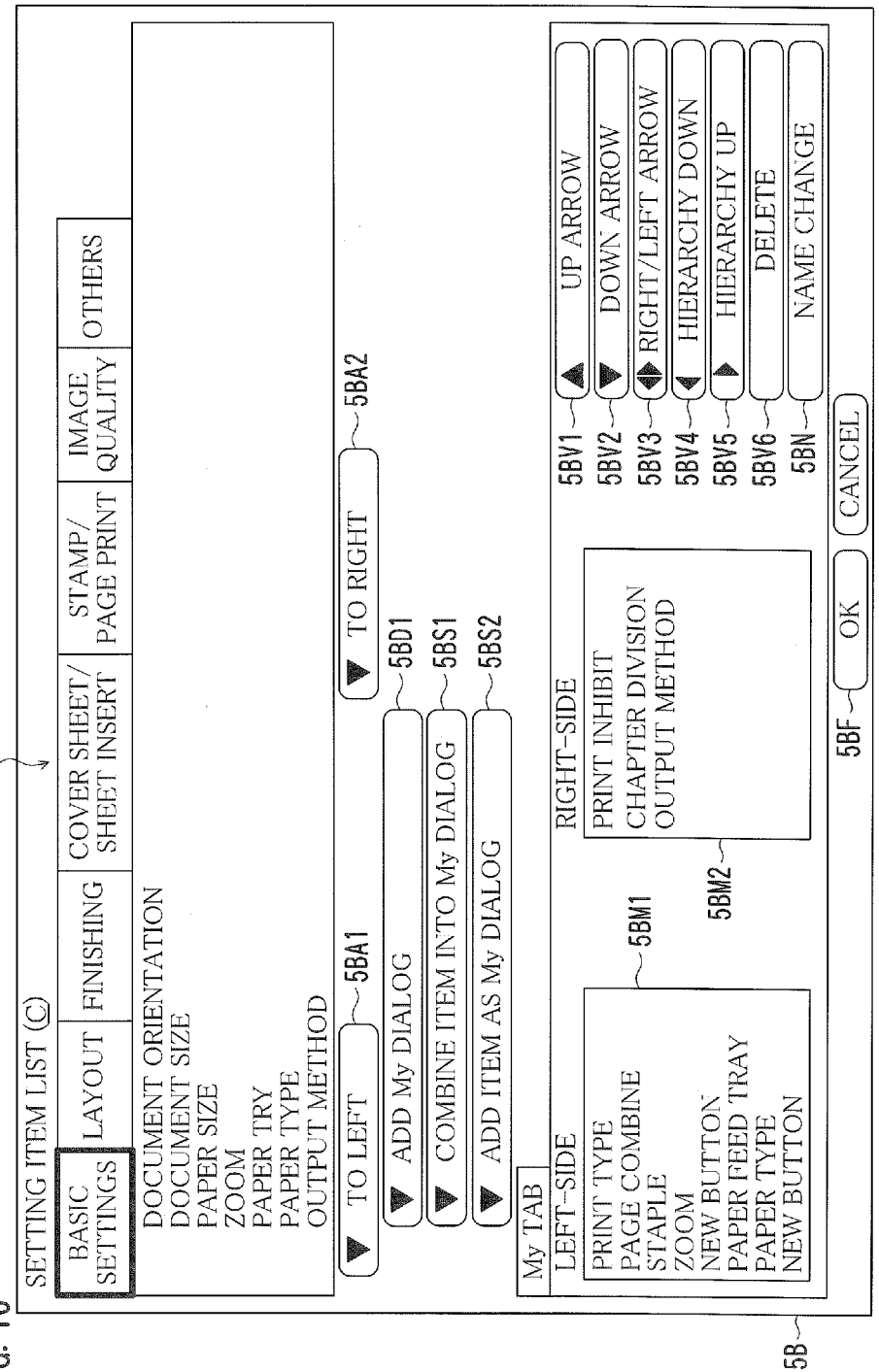
FIG. 10 is a diagram showing an example of a configuration screen.

FIG. 8 is a diagram showing an example of a layout of the conditions designation region 5AR. FIG. 9 is a diagram showing an example of the screen layout data 6K. FIG. 10 is a diagram showing an example of the configuration screen 5B.

In order to edit a custom group, the user enters a predetermined command into the terminal 2.

In response to the predetermined command, the conditions input screen display processing portion 201 reads out, from the screen layout data storage portion 232, screen layout data 6K for a group corresponding to a default tab 5AT. The conditions input screen display processing portion 201 then reads out, from the object data storage portion 231, object data 6J for each object of which an object code is indicated in the screen layout data 6K. The conditions input screen display processing portion 201 then displays, based on the sets of data thus read out, the conditions input screen 5A (see FIG. 5) with the default tab 5AT treated as the target tab. Stated differently, the conditions input screen display processing portion 201 displays the conditions input screen 5A with all the objects of the group placed in the conditions designation region 5AR.

The default tab 5AT may be a specific tab SAT determined in advance. Alternatively, the default tab 5AT may be a tab 5AT which was the last target tab for the case where the conditions input screen 5A was displayed the last time.

When the custom tab 5ATp is not a target tab, the user selects the custom tab 5ATp.

In response to the selection, the conditions input screen display processing portion 201 reads out screen layout data 6K for a group corresponding to the custom tab 5ATp, namely, for a custom group, and reads out object data 6J on each object of the custom group. The conditions input screen display processing portion 201 then changes, based on the sets of data read out, the conditions designation region 5AR in such a manner that all the objects of the custom group are placed. After that, the conditions input screen display processing portion 201 displays again the conditions input screen 5A. An object for a custom group is an example of the specific object according to the present invention.

Meanwhile, concerning the custom group, the conditions designation region 5AR is divided into two sections of a free region 5ARf and a fixed region 5ARy as shown in FIG. 8.

In the free region 5ARf, settings objects 4A for setting items of the custom group are mainly placed. The free region 5ARf is further divided into a left-side free region 5ARf1 and a right-side free region 5ARf2. On the other hand, in the fixed region 5ARy, a predetermined object is placed, and no settings objects 4A for setting items arbitrarily selected by the user are placed.

Referring to FIG. 9, the screen layout data 6K for the custom group includes a left-side arrangement order table 6K1, a right-side arrangement order table 6K2, and a fixed layout data 6K3.

The left-side arrangement order table 6K1 shows object codes of objects placed in the left-side free region 5ARf1 in order from the top to the bottom thereof. The right-side arrangement order table 6K2 shows object codes of objects placed in the right-side free region 5ARf2 in order from the top to the bottom thereof. The fixed layout data 6K3 shows object codes and position (coordinates, for example) of objects placed in the fixed region 5ARy.

The initial state of each of the left-side arrangement order table 6K1 and the right-side arrangement order table 6K2 is a state in which no object codes are shown. Alternatively, the initial state may be a state in which object codes of settings objects 4A for specific setting items frequently used are shown.

In the fixed region 5ARy, an edit button 5ARe (see FIG. 5) is placed. The user selects the edit button 5ARe at a time when the custom tab 5ATp can be used as the target tab.

In response to the selection made by the user, the configuration screen display processing portion 202 closes the conditions input screen 5A, and controls the liquid crystal display 20e to display the configuration screen 5B as shown in FIG. 10.

In the configuration screen 5B, many objects are provided. The objects include a setting item list 5BK, a left-side object add button 5BA1, a right-side object add button 5BA2, a dialog add button 5BD1, a combine button 5BS1, a direct add button 5BS2, a left-side member list 5BM1, a right-side member list 5BM2, an up arrow button 5BV1, a down arrow button 5BV2, a right/left arrow button 5BV3, a hierarchy down button 5BV4, a hierarchy up button 5BV5, a delete button 5BV6, a name change button 5BN, a completion button 5BF, and so on.

The setting item list 5BK has a list box and tabs of groups other than the custom group. Every time when a tab is selected, the configuration screen display processing portion 202 displays, in the list box, names of setting items of a group corresponding to the selected tab.

The left-side member list 5BM1 shows names of objects contained in the left-side arrangement order table 6K1.

Likewise, the right-side member list 5BM2 shows names of objects contained in the right-side arrangement order table 6K2.

In order to edit the custom group, the user uses the objects on the configuration screen 5B as described below. At this time, the custom group change processing portion 203 performs processing for changing the custom group in accordance with the operation by the user in the following manner.

(1) Add Settings Object 4A

The user appropriately switches between the tabs to select, from the setting item list 5BK, a setting item to be added to the custom group. In order to place a settings object 4A for the selected setting item in the left-side free region 5ARf1, the user presses the left-side object add button 5BA1. On the other hand, in order to place such a settings object 4A in the right-side free region 5ARf2, the user presses the right-side object add button 5BA2.

When the left-side object add button 5BA1 is pressed, the custom group change processing portion 203 adds an object code of the settings object 4A for the selected setting item to the bottom of the left-side arrangement order table 6K1 of the custom group.

In the illustrated examples of FIGS. 9 and 10, the left-side member list 5BM1 shows settings objects 4A corresponding to four setting items. When the user selects two of the setting items successively to press the left-side object add button 5BA1, the custom group change processing portion 203 adds object codes of the settings objects 4A corresponding to the two setting items to the bottom of the left-side arrangement order table 6K1.

The custom group change processing portion 203 further generates date/time data 6N (see FIG. 7) on settings objects 4A to store the date/time data 6N into the date/time data storage portion 233. The date/time data 6N shows, as the date/time for addition, a date and time at which an object code of the settings object 4A was added to the left-side arrangement order table 6K1. At this point in time, the date/time for settings change shows NULL.

(2) Delete Settings Object 4A

The user selects, from among the left-side member list 5BM1 or the right-side member list 5BM2, a setting item to be deleted from the custom group to press the delete button 5BV6.

If such a setting item is selected from the left-side member list 5BM1, then the custom group change processing portion 203 deletes, from the left-side arrangement order table 6K1, an object code of the settings object 4A for the selected setting item. If such a setting item is selected from the right-side member list 5BM2, then the custom group change processing portion 203 deletes, from the right-side arrangement order table 6K2, an object code of the settings object 4A for the selected setting item.

(3) Move Right and Left

The user is allowed to move, from side to side, a settings object 4A for a setting item of the custom group. In order to move a left-side settings object 4A to right, the user selects the settings object 4A from the left-side member list 5BM1 to press the right/left arrow button 5BV3.

In response to the right/left arrow button 5BV3 pressed, the custom group change processing portion 203 deletes, from the left-side arrangement order table 6K1, an object code of the settings object 4A, and adds the object code to the bottom of the right-side arrangement order table 6K2.

In order to move a right-side settings object 4A to left, the user selects the settings object 4A from the right-side member list 5BM2 to press the right/left arrow button 5BV3. In response to the right/left arrow button 5BV3 pressed, the custom group change processing portion 203 deletes, from the right-side arrangement order table 6K2, an object code of the settings object 4A, and adds the object code to the bottom of the left-side arrangement order table 6K1.

(4) Move Up and Down

The user is allowed to move a setting item of the custom group upward or downward. The user selects a setting item to be moved upward from the left-side member list 5BM1 or the right-side member list 5BM2 to press the up arrow button 5BV1.

In response to the up arrow button 5BV1 pressed, if such a setting item is selected from the left-side member list 5BM1, then the custom group change processing portion 203 transposes, in the left-side arrangement order table 6K1, the object code of the settings object 4A for the selected setting item and an object code which is shown just above the object code thereof. If such a setting item is selected from the right-side member list 5BM2, then the custom group change processing portion 203 performs such transposition processing on the right-side arrangement order table 6K2 in a similar way.

In order to move a setting item of the custom group downward, the user presses the down arrow button 5BV2. In response to the down arrow button 5BV2 pressed, the custom group change processing portion 203 performs processing, on the left-side arrangement order table 6K1 or the right-side arrangement order table 6K2, for transposing the object code of the settings object 4A for the selected setting item and an object code which is shown just below the object code thereof.

[Edit Dialog Box 5C]

The user is allowed to make a small group of some or all of the setting items of the custom group to display settings objects 4A for the setting items in the dialog box 5C. The settings object 4A contained in the dialog box 5C is an example of a child-specific object according to the present invention. Processing for editing the dialog box 5C is performed by any one of the first dialog box edit processing portion 204, the second dialog box edit processing portion 205, or the third dialog box edit processing portion 206. Stated differently, there are provided three embodiments as the edit processing. The three embodiments are described in order below.

[First Embodiment]

Figure 11:
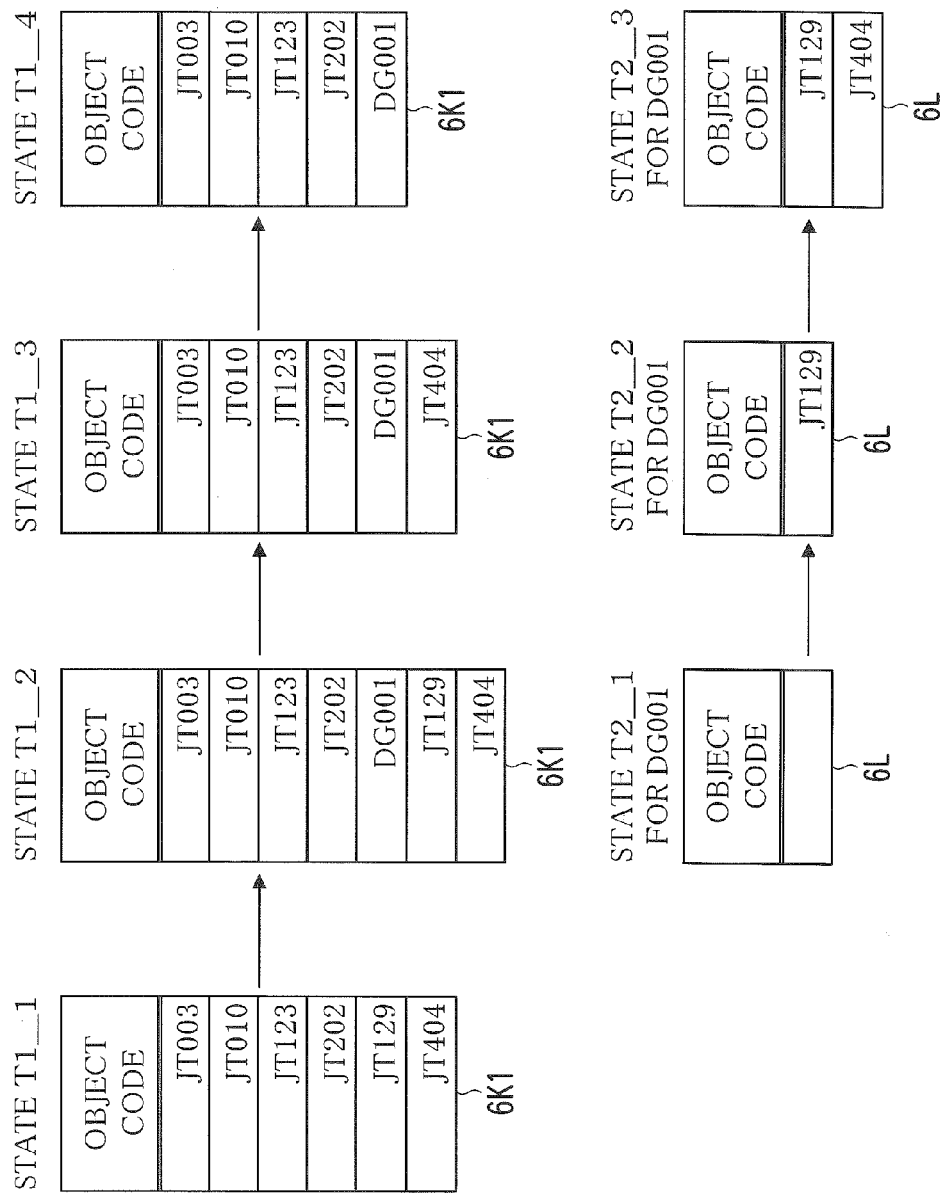
FIG. 11 is a diagram showing an example of transition of a left-side arrangement order table and transition of screen layout data.
Figure 12:
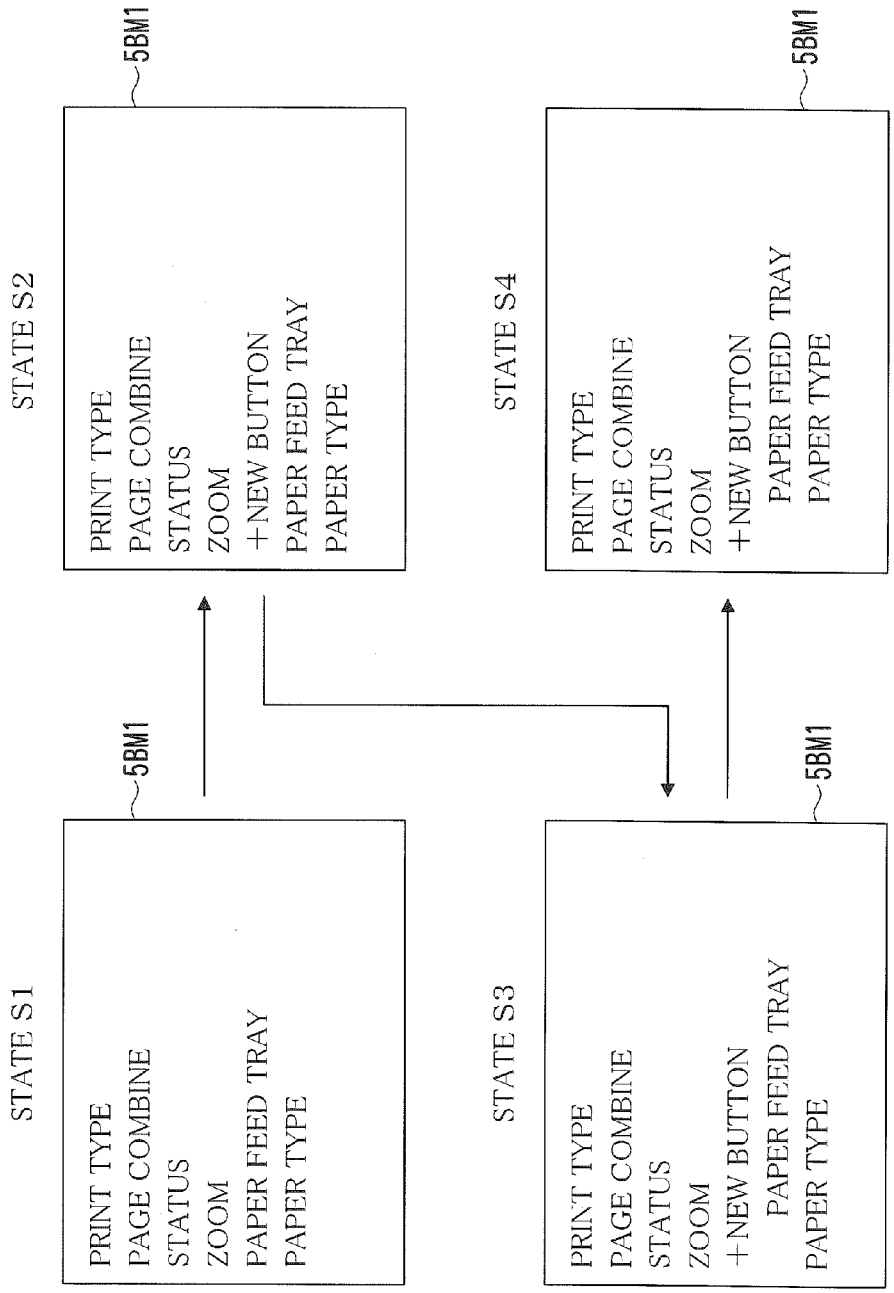
FIG. 12 is a diagram showing an example of transition of a left-side member list.
Figure 13:
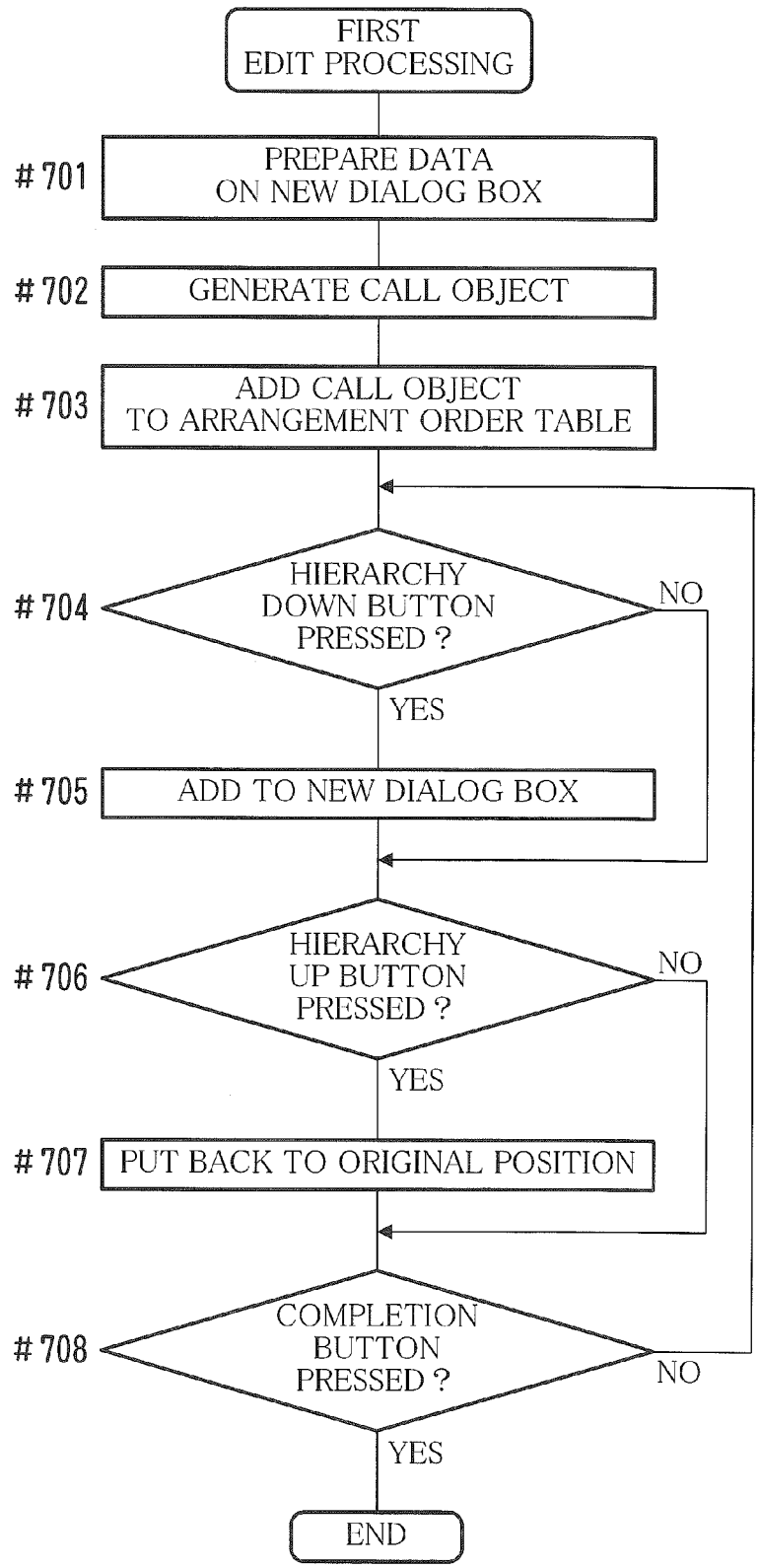
FIG. 13 is a flowchart depicting an example of the flow of first edit processing.
Figure 14:
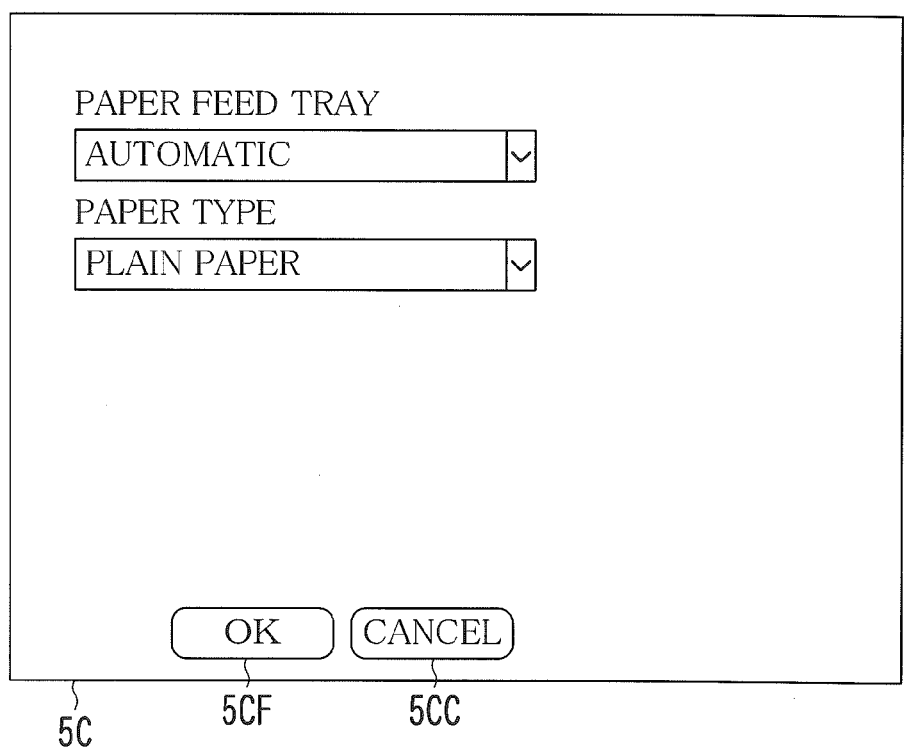
FIG. 14 is a diagram showing an example of a dialog box.
Figure 15:
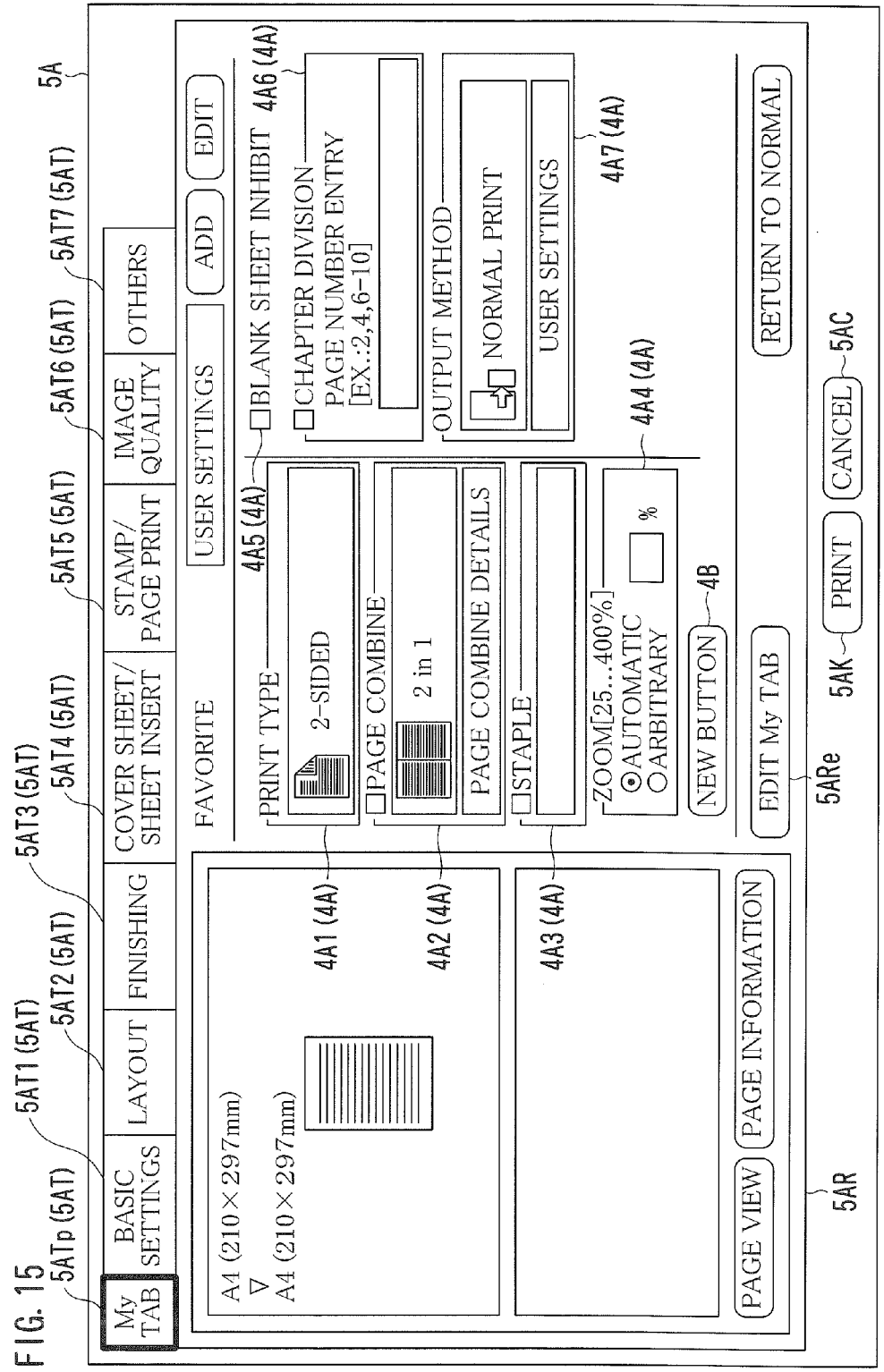
FIG. 15 is a diagram showing an example of a state of a conditions input screen to which a dialog box is added.
Figure 16:
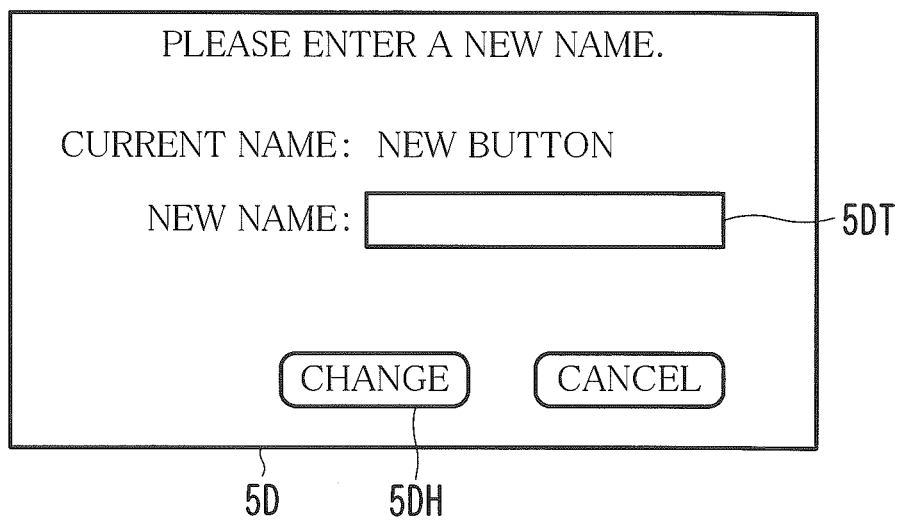
FIG. 16 is a diagram showing an example of a name change screen.
Figure 18:
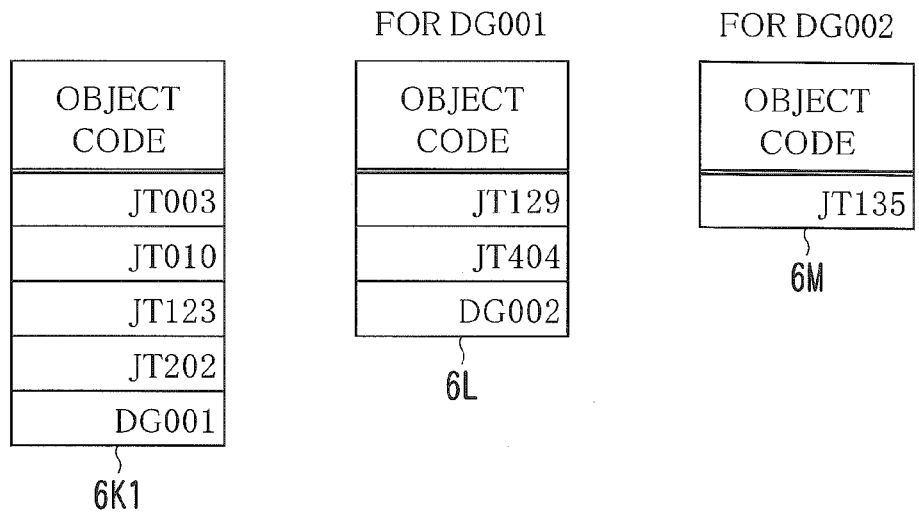
FIG. 18 is a diagram showing an example of a state of a left-side arrangement order table, screen layout data, and screen layout data after a second small group is generated.
Figure 19:
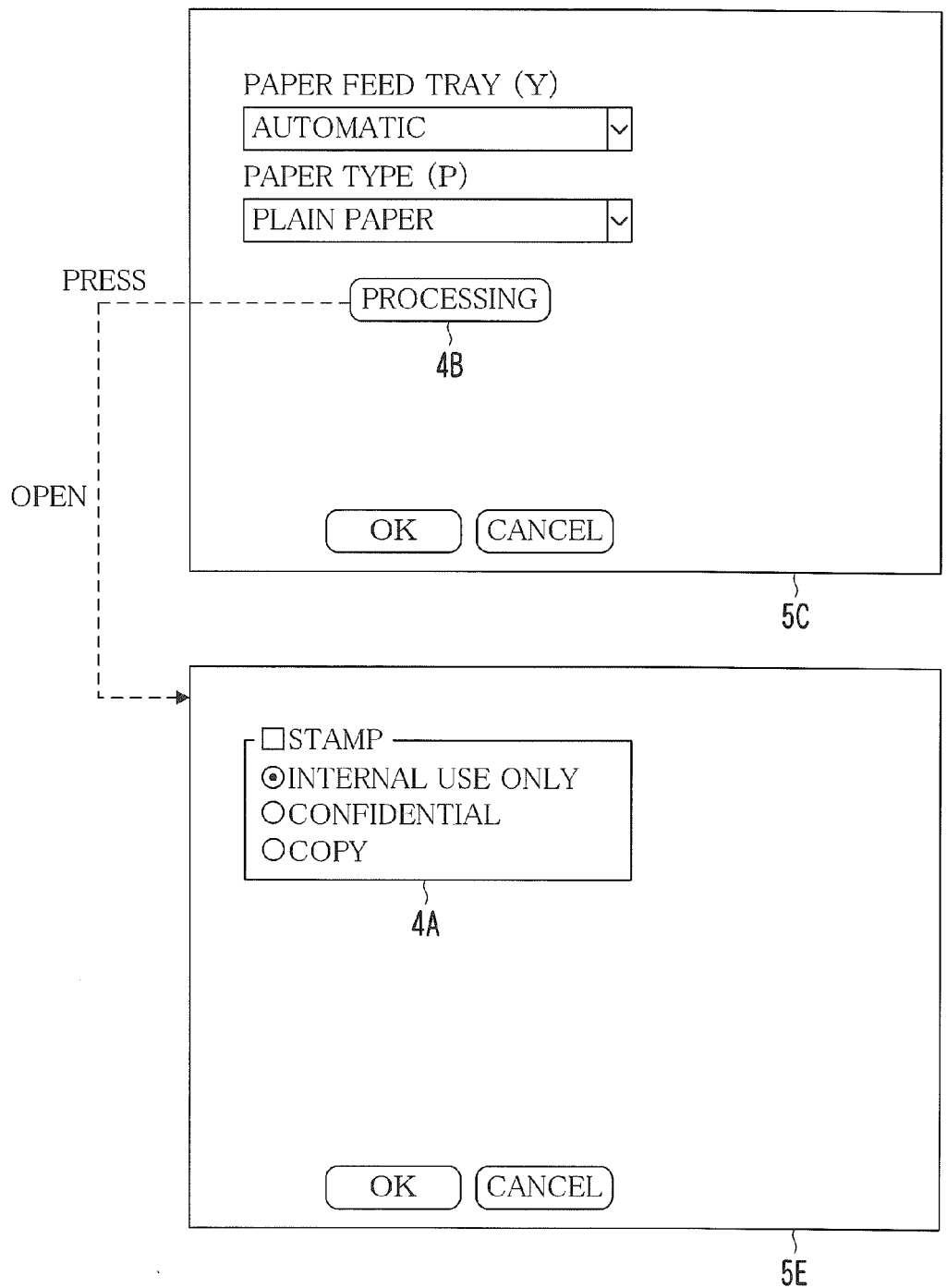
FIG. 19 is a diagram showing an example of transition of a dialog box.

FIG. 11 is a diagram showing an example of transition of the left-side arrangement order table 6K1 and transition of screen layout data 6L. FIG. 12 is a diagram showing an example of transition of the left-side member list 5BM1. FIG. 13 is a flowchart depicting an example of the flow of first edit processing. FIG. 14 is a diagram showing an example of the dialog box 5C. FIG. 15 is a diagram showing an example of a state of the conditions input screen 5A to which the dialog box 5C is added. FIG. 16 is a diagram showing an example of the name change screen 5D. FIG. 17 is a diagram showing an example of a state of the left-side member list 5BM1 after a name of a call object 4B is changed. FIG. 18 is a diagram showing an example of a state of the left-side arrangement order table 6K1, the screen layout data 6L, and the screen layout data 6L after a second small group is generated. FIG. 19 is a diagram showing an example of transition of a dialog box.

In the first embodiment, only objects provided in the configuration screen 5B are used. The first embodiment is hereinafter described with reference to FIGS. 11 and 12 by taking an example in which processing is performed on the left-side member list 5BM1.

If there are a plurality of setting items to be classified into a small group, a user performs the variety of processing in advance to edit the left-side member list 5BM1 so as to make a group of the setting items.

The user selects, from among one or more setting items to be classified into the small group, a setting item listed at the top of the left-side member list 5BM1, and presses the dialog add button 5BD1. In response to this operation, the first dialog box edit processing portion 204 performs processing in a manner as depicted in FIG. 13.

The first dialog box edit processing portion 204 prepares data on a new dialog box 5C (Step #701 of FIG. 13). To be specific, the first dialog box edit processing portion 204 generates screen layout data 6L on the dialog box 5C as shown in a state T2_1 of FIG. 11 to store the screen layout data 6L into the screen layout data storage portion 232. The first dialog box edit processing portion 204 also generates object data 6J on an object (button, for example) to open the dialog box 5C to store the object data 6J into the object data storage portion 231 (Step #702). Hereinafter, an object to open a dialog box is sometimes referred to as a "call object 4B" to distinguish the same from objects for other purposes.

In the screen layout data 6L, object codes of objects to be placed in the dialog box 5C are shown sequentially starting from the top object in the arrangement order. At this point in time, no object codes are shown in the screen layout data 6L.

As shown in the state T1_2 of FIG. 11, the first dialog box edit processing portion 204 then adds an object code of the generated call object 4B, e.g., "DG001", to right above the object code of the settings object 4A for the selected setting item in the left-side arrangement order table 6K1 (Step #703).

In accordance with the update to the left-side arrangement order table 6K1 and the screen layout data 6L, the configuration screen display processing portion 202 updates the left-side member list 5BM1 from a state S1 to a state S2 shown in FIG. 12. In short, the configuration screen display processing portion 202 adds a name of the call object 4B. The call object 4B is given a default temporary name, e.g., a "new button". In the left-side member list 5BM1 and the right-side member list 5BM2, a predetermined sign, e.g., "+", is added before the name of the call object 4B.

The user then selects a setting item to be classified into the small group ("paper-feed tray" in the example of FIG. 12) to press the hierarchy down button 5BV4.

In response to this operation (Yen in Step #704), as shown in a state T1_3 of FIG. 11, the custom group change processing portion 203 deletes an object code of the selected setting item from the left-side arrangement order table 6K1 to add the object code to the screen layout data 6L as shown in a state T2_2 (Step #705). In this way, the selected setting item is classified into the small group.

In accordance with the update to the left-side arrangement order table 6K1, the configuration screen display processing portion 202 updates the left-side member list 5BM1 from the state S2 to a state S3 shown in FIG. 12. In short, the configuration screen display processing portion 202 moves down, by one step, the hierarchy of the name of the settings object 4A for the setting item classified into the small group. Stated differently, the name of the object is indented.

If the setting item classified into the small group is removed from the small group, the user preferably selects the settings object 4A for the setting item from among the left-side member list 5BM1 to press the hierarchy up button 5BV5.

In response to the operation by the user (Yes in Step #706), as shown in the state "T2_1" of FIG. 11, the custom group change processing portion 203 deletes an object code of the selected setting item from the screen layout data 6L, and puts the object code back to the original position of the left-side arrangement order table 6K1 as shown in the state T1_2 (Step #707). The configuration screen display processing portion 202 then displays the left-side member list 5BM1 again as shown in the state S2 of FIG. 12.

The user is also allowed to add, to the small group, a settings object 4A for a setting item shown just below in the left-side member list 5BM1. In such a case, the settings object 4A is preferably selected from among the left-side member list 5BM1 to press the hierarchy down button 5BV4.

In response to this operation (Yes in Step #704), the custom group change processing portion 203 deletes an object code of the settings object 4A from the left-side arrangement order table 6K1 as shown in a state T1_4 of FIG. 11, and adds the object code to the screen layout data 6L as shown in a state T2_3 (Step #705). The custom group change processing portion 203 updates the left-side member list 5BM1 from the state S3 to a state S4 of FIG. 12. In short, the custom group change processing portion 203 moves down, by one step, the hierarchy of the name of the settings object 4A.

In what way the dialog box 5C is edited in the first embodiment is described above. When finishing editing the dialog box 5C, the user presses the completion button 5BF.

In response to the completion button 5BF pressed (Yes in Step #708), the conditions input screen display processing portion 201 closes the configuration screen 5B to display the conditions input screen 5A based on the updated left-side arrangement order table 6K1 (see the state T1_4 of FIG. 11).

In short, the conditions input screen display processing portion 201 displays the conditions input screen 5A with a call object 4B to call the dialog box 5C placed. When the call object 4B is selected, the conditions input screen display processing portion 201 displays the dialog box 5C on the configuration screen 5B based on the screen layout data 6L (see the state T2_3 of FIG. 11) as shown in FIG. 14. A completion button 5CK and a cancel button 5CC in the dialog box 5C are always provided.

In the case where a settings object 4A for a setting item of the custom group (including a subordinate small group or a second small group described later) is used in the conditions input screen 5A, the dialog box 5C, or a dialog box 5E, and the conditions are modified therein, the date/time for settings change indicated in the date/time data 6N (see FIG. 7) on the settings object 4A is updated with the date and time at which the settings object 4A is used this time.

The job command processing portion 207 then instructs the image forming apparatus 1 to perform print processing based on the conditions designated by the user.

The user is allowed to change the name of a call object 4B in the following manner. The user selects the call object 4B from the left-side member list 5BM1 to press the name change button 5BN.

In response to the operation by the user, the configuration screen display processing portion 202 displays the name change screen 5D as shown in FIG. 16. The user enters a new name into a text box 5DT to press the change button 5DH in the name change screen 5D.

The first dialog box edit processing portion 204 then updates the object data 6J on the call object 4B in such a manner that the entered name is indicated as the name of the call object 4B.

The user is also allowed to classify some of the setting items into a group which is further smaller (lower) than the small group. The further smaller (lower) group is hereinafter referred to as a "second small group". The user performs the variety of processing in combination to change the left-side member list 5BM1, for example, as shown in FIG. 17. To be specific, a call object 4B to call the dialog box 5E for the second small group (call object 4B named "processing") is added under an settings object 4A for the setting item listed in the bottom of the small group ("paper type" in the example of FIG. 17). Further, right under the call object 4B, a settings object 4A for a setting item (stamp) classified into the second small group is added.

The custom group change processing portion 203 then modifies the left-side arrangement order table 6K1 and the screen layout data 6L as shown in FIG. 18, and generates new screen layout data 6M as screen layout data on the dialog box 5E.

The conditions input screen display processing portion 201 then displays the dialog box 5C as shown in FIG. 19 based on the updated screen layout data 6L and so on. In response to the call object 4B pressed, the dialog box 5E is displayed based on the screen layout data 6M and so on.

On the configuration screen 5B (see FIG. 10), the user can classify some of setting items belonging to a custom group into a small group, or, integrate the small group to the original custom group instantly and simply. The settings objects 4A for the setting items can be displayed separately (see FIG. 14). This enables the settings objects 4A for the setting items to be displayed in a way more clearly, for the user, than is conventionally possible.

[Second Embodiment]

Figure 20:
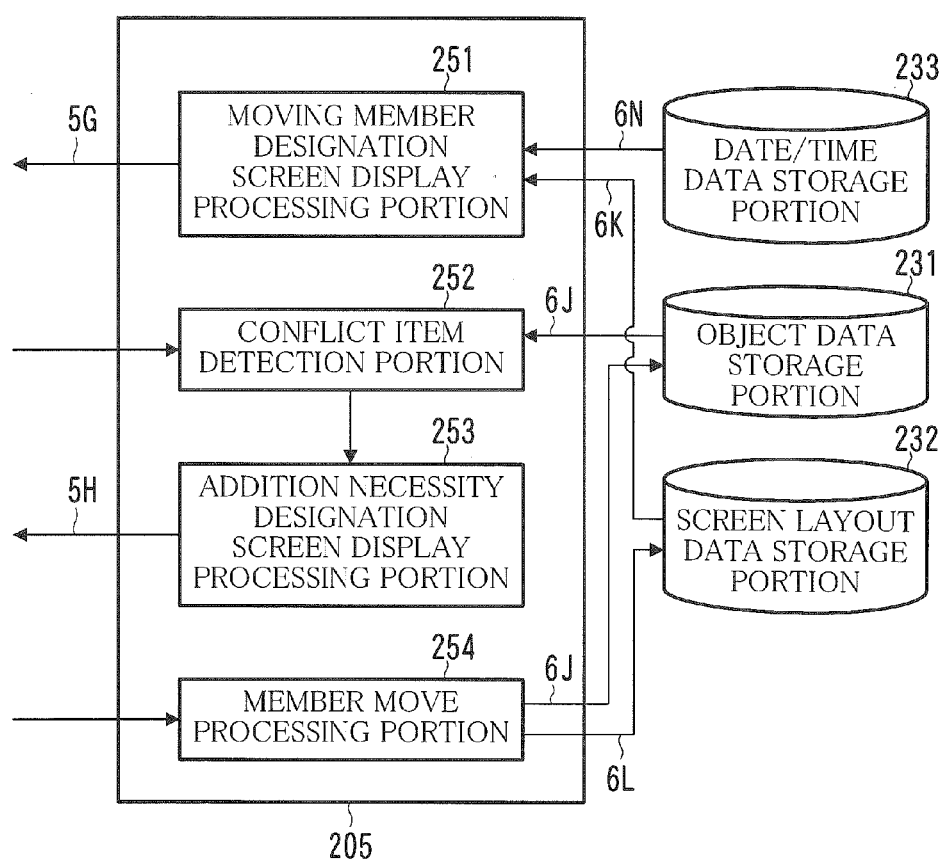
FIG. 20 is a diagram showing an example of the configuration of a second dialog box edit processing portion.
Figure 21:
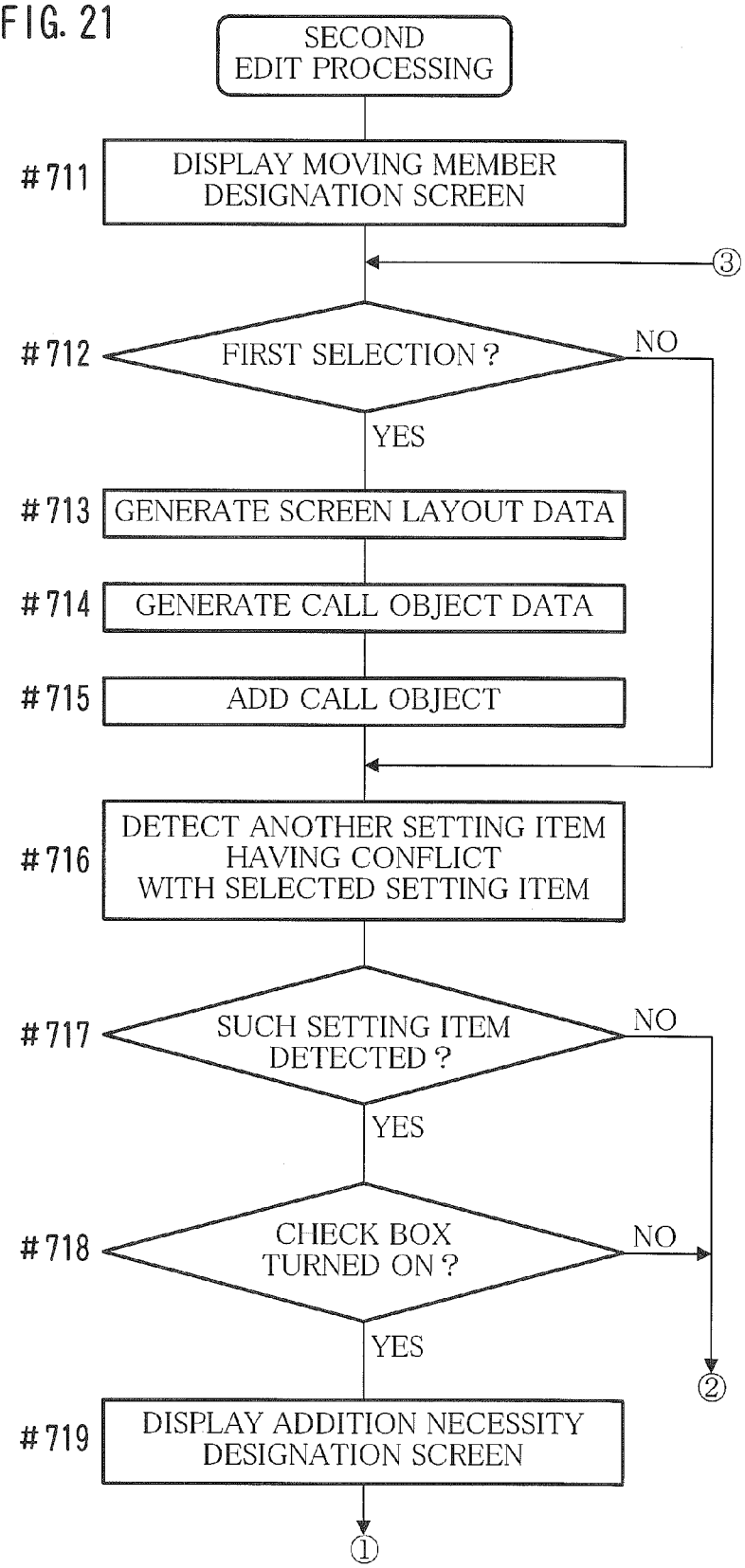
FIG. 21 is a flowchart depicting an example of the flow of second edit processing.
Figure 22:
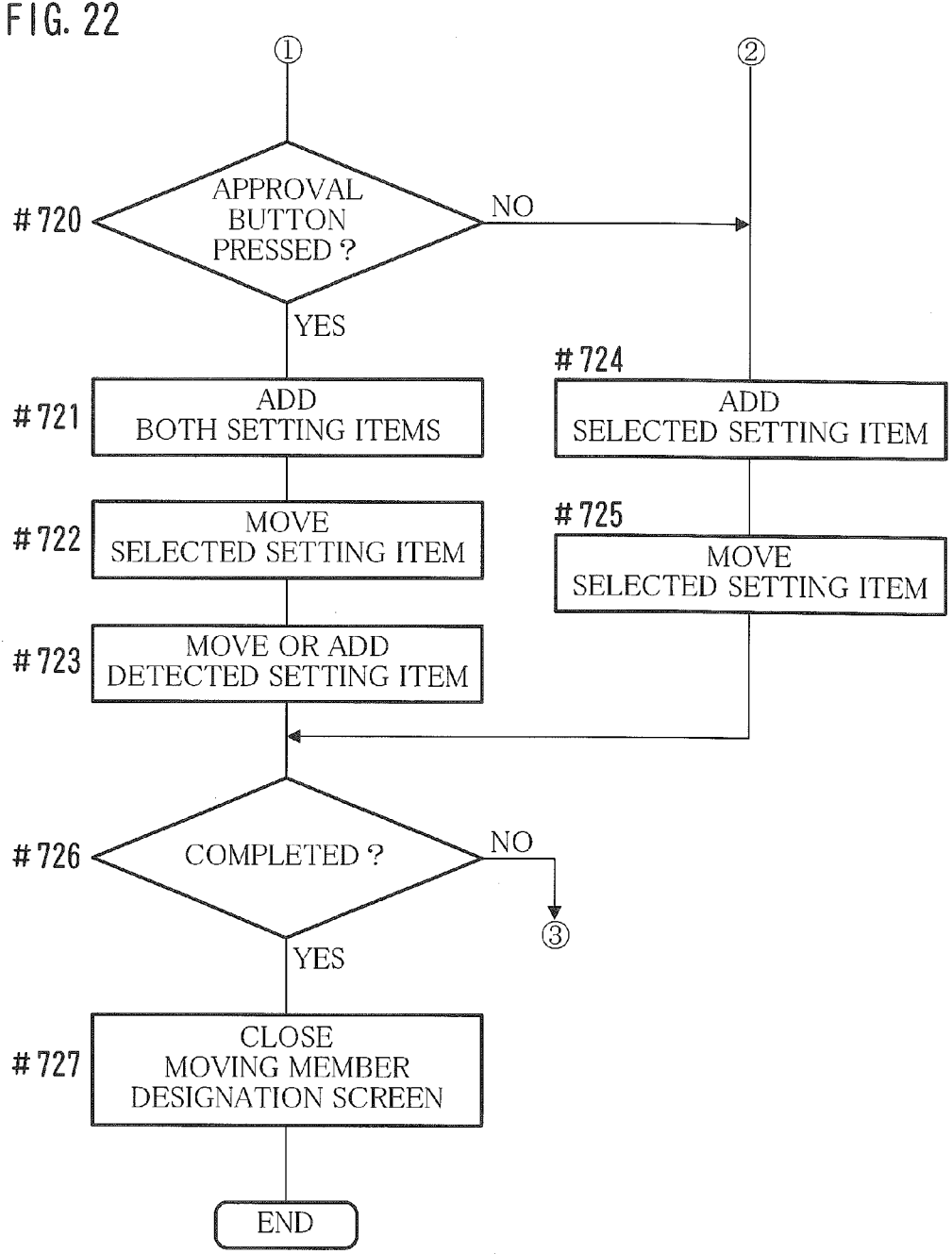
FIG. 22 is a flowchart depicting an example of the flow of second edit processing.
Figure 23:
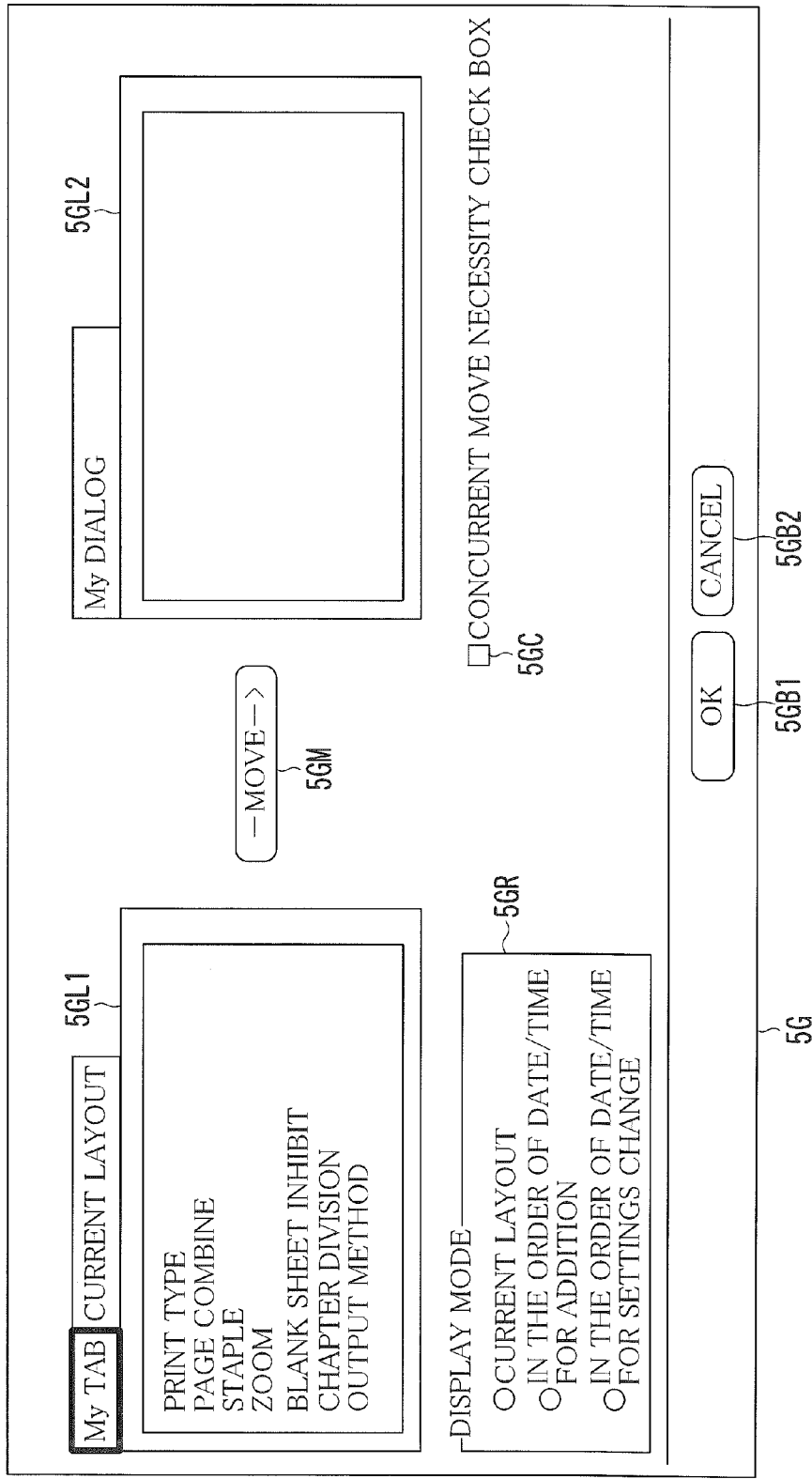
FIG. 23 is a diagram showing an example of a moving member designation screen.
Figure 24:
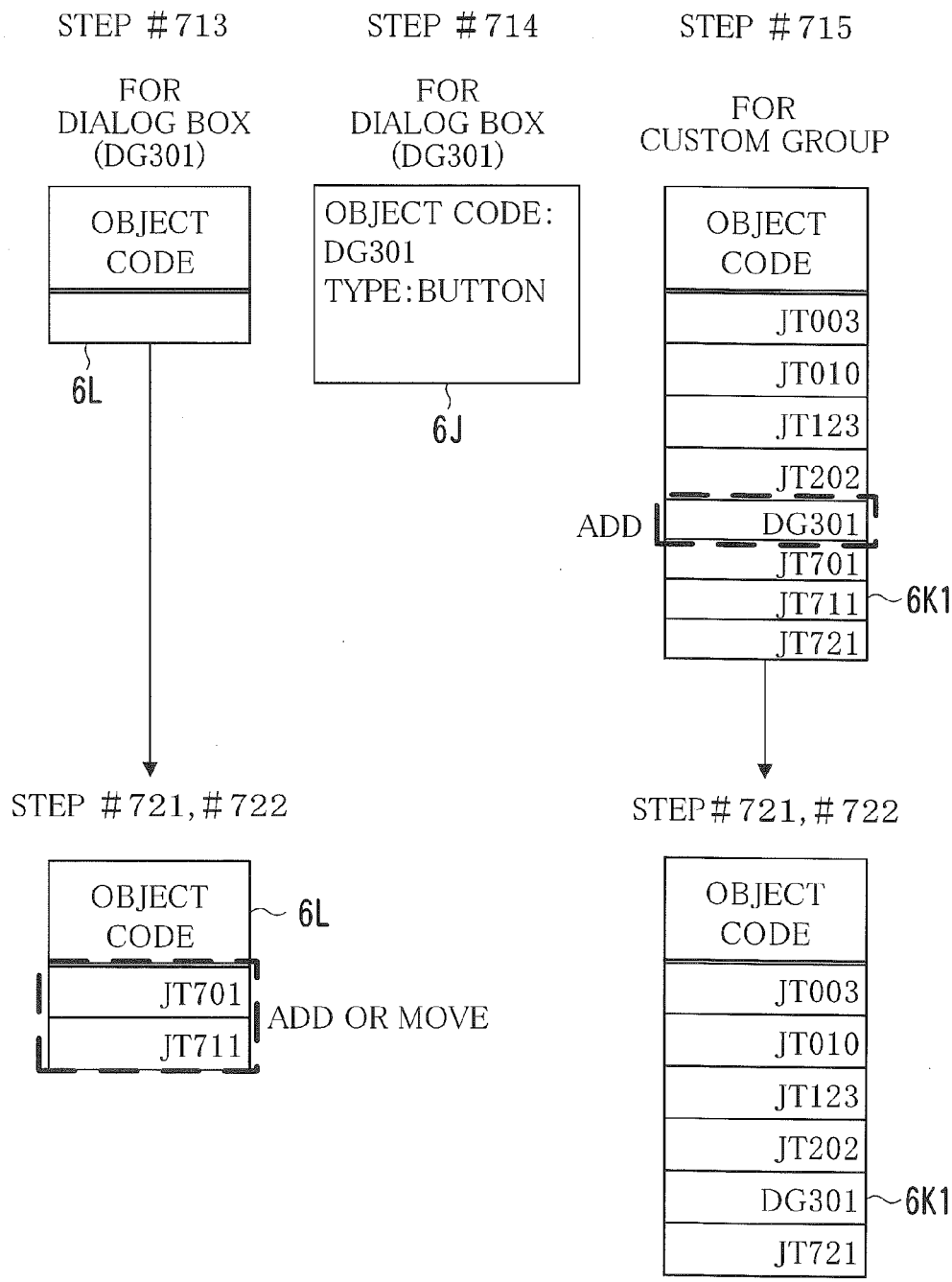
FIG. 24 is a diagram showing an example of data transition according to the second embodiment.
Figure 27:
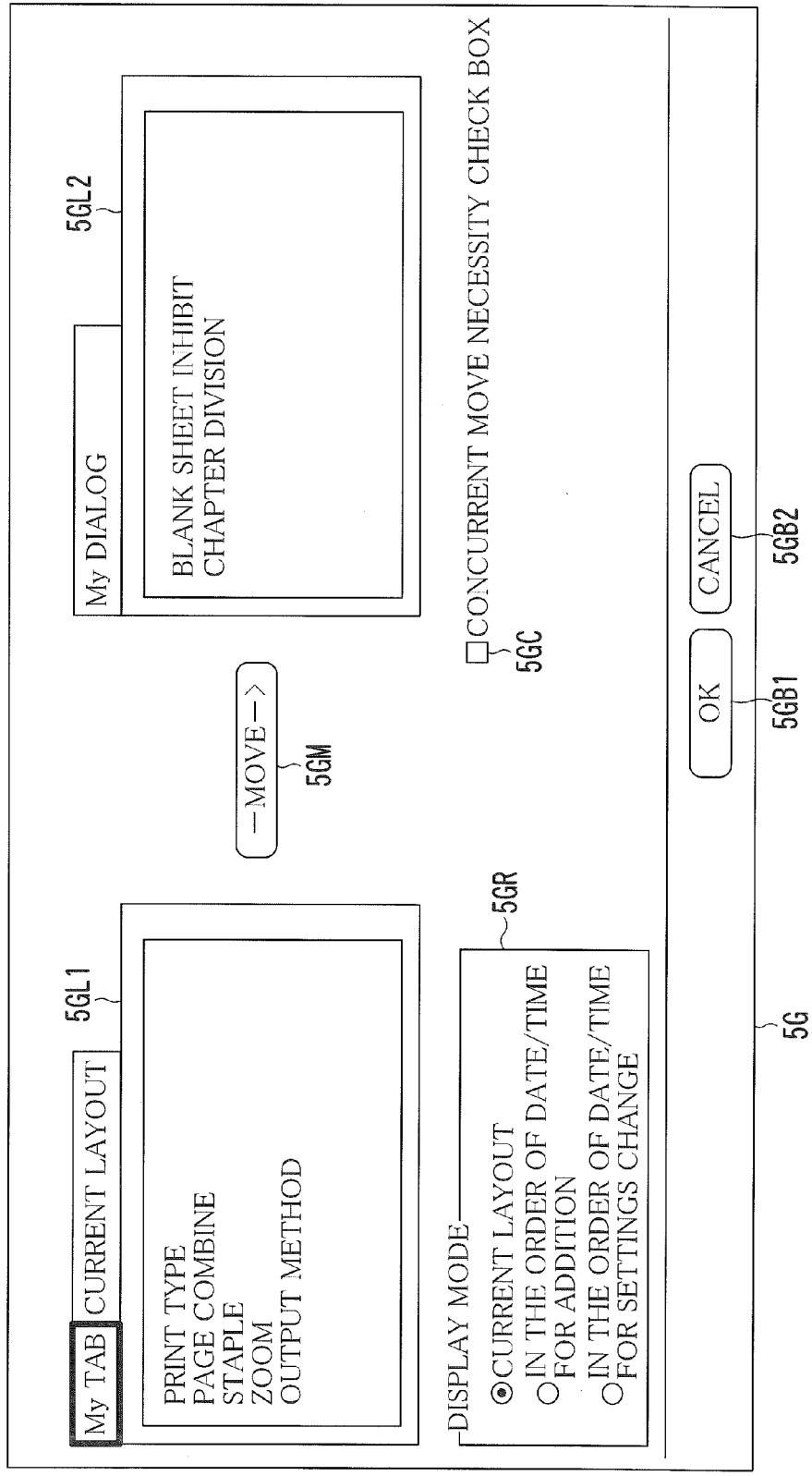
FIG. 27 is a diagram showing an example of a state of a moving member designation screen after a small group is generated.

FIG. 20 is a diagram showing an example of the configuration of a second dialog box edit processing portion 205. FIGS. 21 and 22 are flowcharts depicting an example of the flow of second edit processing. FIG. 23 is a diagram showing an example of a moving member designation screen 5G. FIG. 24 is a diagram showing an example of data transition according to the second embodiment. FIG. 25 is a diagram showing an example of the object data 6J on a setting item having a conflict with another setting item. FIG. 26 is a diagram showing an example of an addition necessity designation screen 5H. FIG. 27 is a diagram showing an example of a state of the moving member designation screen 5G after a small group is generated.

In the first embodiment, the user uses only the configuration screen 5B. In contrast thereto, according to the second embodiment, the user uses not only the configuration screen 5B but other screens such as the moving member designation screen 5G (see FIG. 23). The moving member designation screen 5G is an example of an edit screen according to the present invention.

In the second embodiment, the processing is performed by the second dialog box edit processing portion 205. Hereinafter, the second dialog box edit processing portion 205 is described. Description of points common to the first embodiment shall be omitted.

Referring to FIG. 20, the second dialog box edit processing portion 205 is configured of a moving member designation screen display processing portion 251, a conflict item detection portion 252, an addition necessity designation screen display processing portion 253, a member move processing portion 254, and so on.

The user adds, in advance, a setting item regarded as a member of a custom group to the left-side member list 5BM1 or the right-side member list 5BM2 of the configuration screen 5B (see FIG. 10). How to add the setting item is the same as that in the first embodiment. Hereinafter, an example is described in which settings are made on the left of the conditions designation region 5AR (refer to the left-side free region 5ARf1 of FIG. 8). Accordingly, the user adds, in advance, the setting item to the left-side member list 5BM1.

In the first embodiment, after the addition, the user uses the dialog add button 5BD1, the hierarchy down button 5BV4, and so on. However, in the second embodiment, the user presses the combine button 5BS1 after selecting the left-side member list 5BM1. In response to the combine button 5BS1 pressed, the moving member designation screen display processing portion 251 through the member move processing portion 254 perform processing according to the steps depicted in FIGS. 21 and 22.

The moving member designation screen display processing portion 251 displays the moving member designation screen 5G shown in FIG. 23 on the configuration screen 5B (Step #711 of FIG. 21).

In the moving member designation screen 5G, there are provided a member list 5GL1, a combined target list 5GL2, a move button 5GM, a display mode selection button group 5GR, a concurrent move necessity check box 5GC, a completion button 5GB1, a cancel button 5GB2, and so on.

The member list 5GL1 is a list of setting items that are members of a custom group. The member list 5GL1 indicates names of setting items of settings objects 4A of which an object code is indicated in the left-side arrangement order table 6K1 (see FIG. 9).

The combined target list 5GL2 shows names of setting items to be integrated into a small group. The combined target list 5GL2 shows nothing when the moving member designation screen 5G is displayed at first.

The display mode selection button group 5GR includes three radio buttons for changing the arrangement order of the members shown in the member list 5GL1.

At a time when the moving member designation screen 5G is displayed at first, the moving member designation screen display processing portion 251 displays the member list 5GL1 in such a manner that names of the setting items are displayed in the same order as that shown in the left-side arrangement order table 6K1, namely, in the same order as that shown in the left-side free region 5ARf1. Of the radio buttons in the display mode selection button group 5GR, a radio button for "current layout" is ON.

When the user turns a radio button for "in the order of date/time for addition" ON, the moving member designation screen display processing portion 251 sorts the setting items in the member list 5GL1 in order from the newest date/time for addition. The date/time for addition is shown in the date/time data 6N (see FIG. 7).

When the user turns a radio button for "in the order of date/time for settings change" ON, the moving member designation screen display processing portion 251 sorts the setting items in the member list 5GL1 in order from the newest date/time for settings change. The date/time for settings change is also shown in the date/time data 6N.

After that, when the user turns the radio button for "current layout" ON, the moving member designation screen display processing portion 251 sorts again the setting items in accordance with the order shown in the left-side arrangement order table 6K1.

The user sorts the setting items by using the display mode selection button group 5GR appropriately to find out, from the member list 5GL1, a setting item to be put into the small group. The user then selects the first setting item to press the move button 5GM.

In the meantime, regarding setting items having a conflict with each other, conditions can be preferably checked at the same time. In view of this, when the user intends to put, into the dialog box 5C, the setting item selected from the member list 5GL1 and another setting item having a conflict with the selected setting item, he/she turns a concurrent move necessity check box 5GC ON in advance to press the move button 5GM.

When the first setting item is selected and the move button 5GM is pressed (Yes in Step #712), the member move processing portion 254 performs processing on table data and object data as shown in FIG. 24. The member move processing portion 254 generates screen layout data 6L on a dialog box 6C of the small group to store the screen layout data 6L into the screen layout data storage portion 232 (Step #713). The member move processing portion 254 generates object data 6J on the call object 4B to call the dialog box 5C to store the object data 6J into the object data storage portion 231 (Step #714). The member move processing portion 254 adds an object code of the generated call object 4B to the left-side arrangement order table 6K1 in such a manner that the object code is listed right above an object code of a settings object 4A for the selected setting item (Step #715).

The conflict item detection portion 252 detects another setting item having a conflict with the selected setting item based on object data 6J on the settings object 4A for the selected setting item (Step #716). For example, when the selected setting item is "print inhibit", and when object data 6J on a settings object 4A for the print inhibit indicates, as the conflict object code, an object code of a settings object 4A for "chapter division" as shown in FIG. 25, the conflict item detection portion 252 detects chapter division.

If the conflict item detection portion 252 detects such a setting item (Yes in Step #717), then the addition necessity designation screen display processing portion 253 displays an addition necessity designation screen 5H as shown in FIG. 26 on the liquid crystal display 20e (Step #719) as long as the concurrent move necessity check box 5GC is ON (Yes in Step #718). The addition necessity designation screen 5H is a screen for requesting the user to designate whether or not the detected setting item is to be put into the small group together with the setting item selected from the member list 5GL1.

If the setting items having a conflict with each other may be put into the small group, then the user presses an approval button 5HB1.

In response to the approval button 5HB1 pressed (Yes in Step #720 of FIG. 22), the moving member designation screen display processing portion 251 adds both the selected setting item and the detected setting item to the combined target list 5GL2 as shown in FIG. 27 (Step #721). If the selected setting item and the detected setting item are contained in the member list 5GL1, then the selected setting item and the detected setting item may be deleted from the member list 5GL1. The member move processing portion 254 adds, to the screen layout data 6L, the object code of the settings object 4A for the selected setting item, and deletes the object code thereof from the left-side arrangement order table 6K1 (Step #722). The member move processing portion 254 adds, to the screen layout data 6L, the object code of the settings object 4A for the detected setting item, and deletes the object code thereof if the left-side arrangement order table 6K1 indicates the object code (Step #723). In this way, the left-side arrangement order table 6K1 and the screen layout data 6L are updated as shown in FIG. 24.

On the other hand, if the conflict item detection portion 252 does not detect such a setting item (No in Step #717), further, if the concurrent move necessity check box 5GC is OFF (No in Step #718), and further, if a disapproval button 5HB2 is pressed (No in Step #720), then the moving member designation screen display processing portion 251 adds only the selected setting item to the combined target list 5GL2 (Step #724). The member move processing portion 254 adds, to the screen layout data 6L, the object code of the settings object 4A for the selected setting item, and deletes the object code thereof from the left-side arrangement order table 6K1 (Step #725).

In order to further add a setting item to the small group, the user preferably selects the setting item from the member list 5GL1 to press the move button 5GM.

In response to the operation by the user (No in Step #712), the moving member designation screen display processing portion 251, the conflict item detection portion 252, and the addition necessity designation screen display processing portion 253 perform the foregoing processing basically. However, the processing from Step #713 through Step #715 is bypassed.

After finishing adding the setting item to the small group, the user presses the completion button 5GB1. In response to the completion button 5GB1 pressed (Yes in Step #726), the configuration screen display processing portion 202 closes the moving member designation screen 5G, updates the state of the left-side member list 5BM1 in accordance with the generation of the small group and addition of the call object 4B, and displays the configuration screen 5B (Step #727).

In what way the dialog box 5C is edited in the second embodiment is described above. When finishing editing the dialog box 5C, the user presses the completion button 5BF. In response to the completion button 5BF pressed, the conditions input screen display processing portion 201 closes the configuration screen 5B to display the conditions input screen 5A based on the updated left-side arrangement order table 6K1.

On the moving member designation screen 5G (see FIG. 23), the user can classify some of setting items belonging to a custom group into a small group more instantly and simply as compared to the case where the configuration screen 5B (see FIG. 10) is used.

[Third Embodiment]

Figure 28:
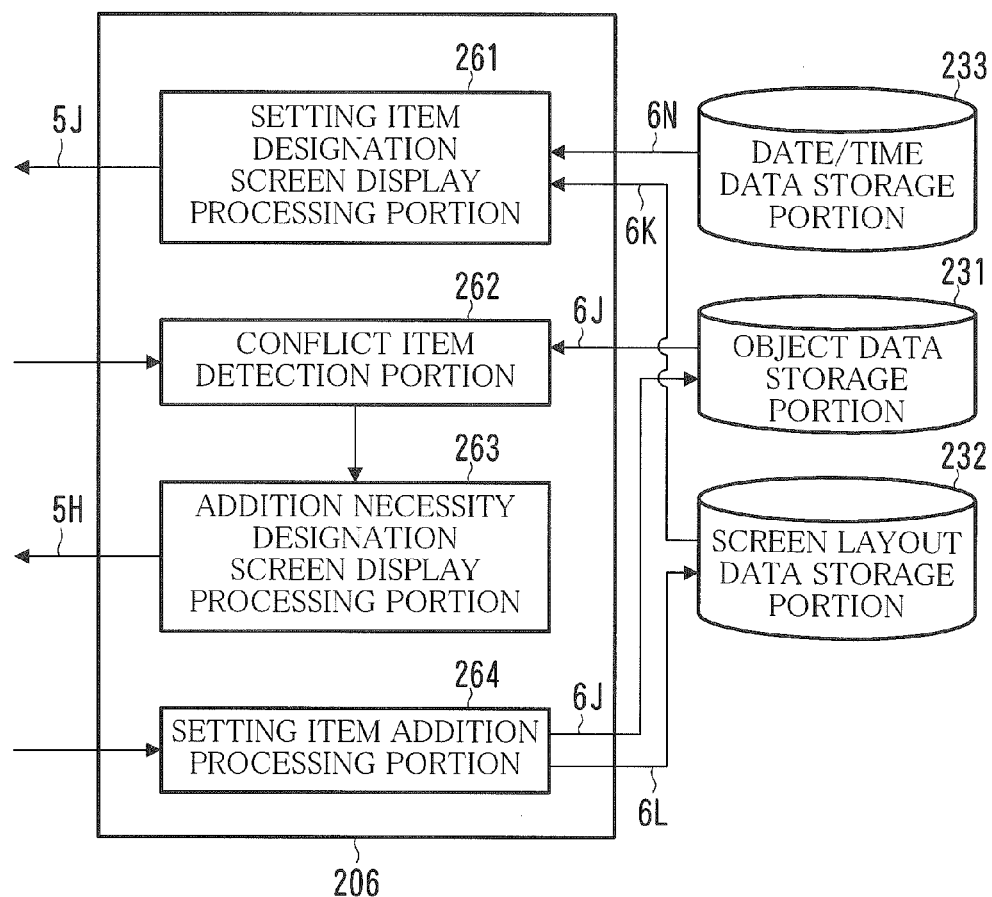
FIG. 28 is a diagram showing an example of the configuration of a second dialog box edit processing portion.
Figure 29:
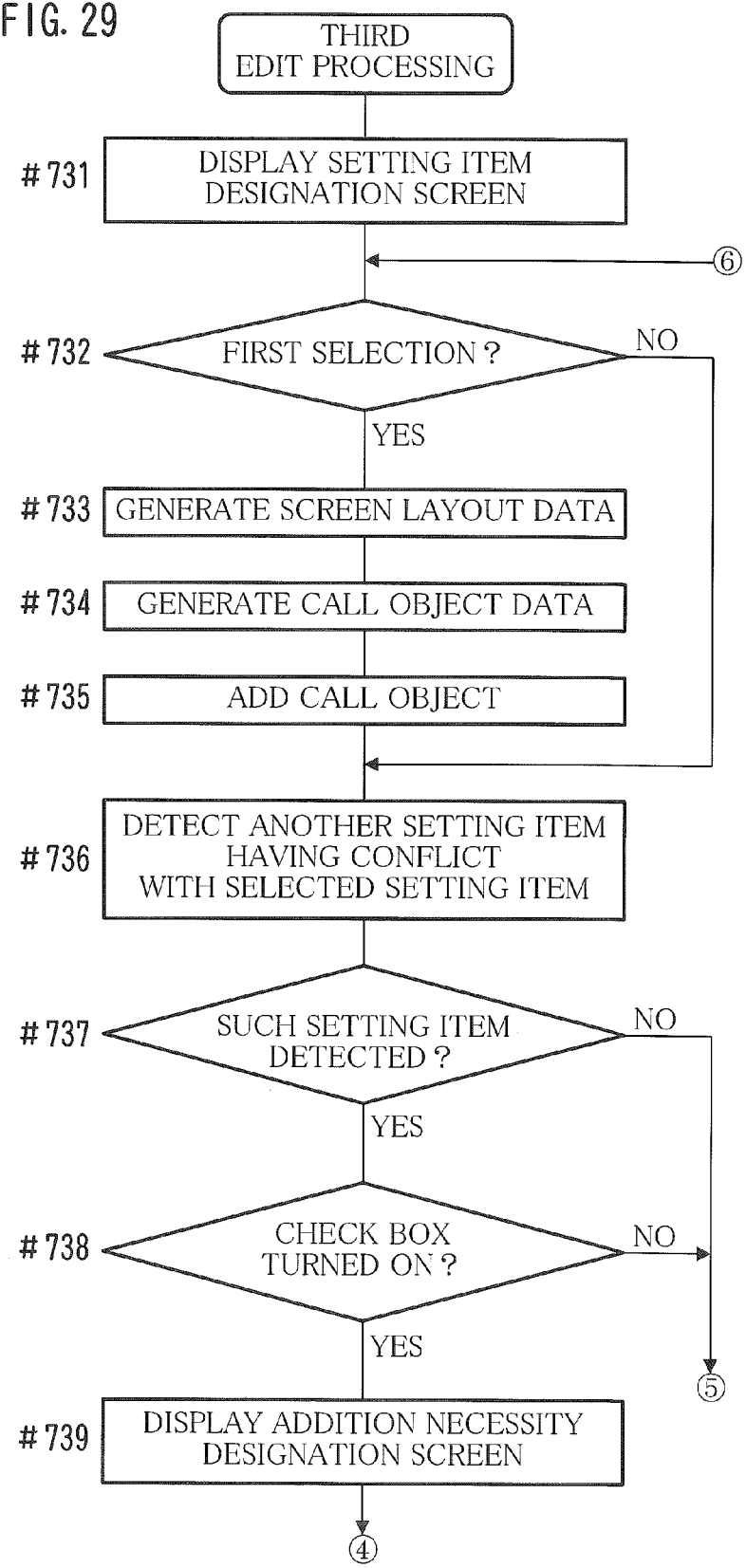
FIG. 29 is a flowchart depicting an example of the flow of third edit processing.
Figure 30:
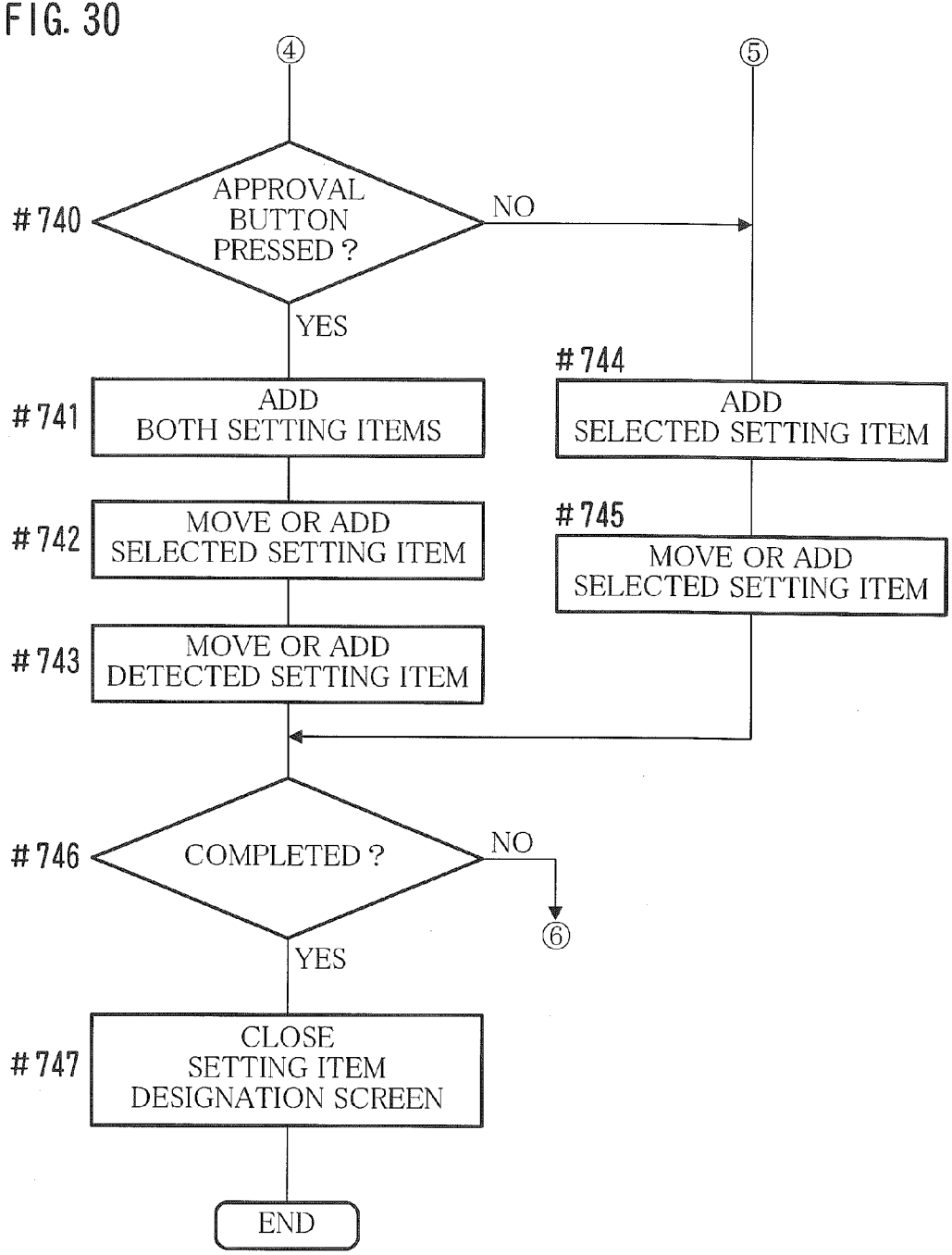
FIG. 30 is a flowchart depicting an example of the flow of third edit processing.
Figure 31:
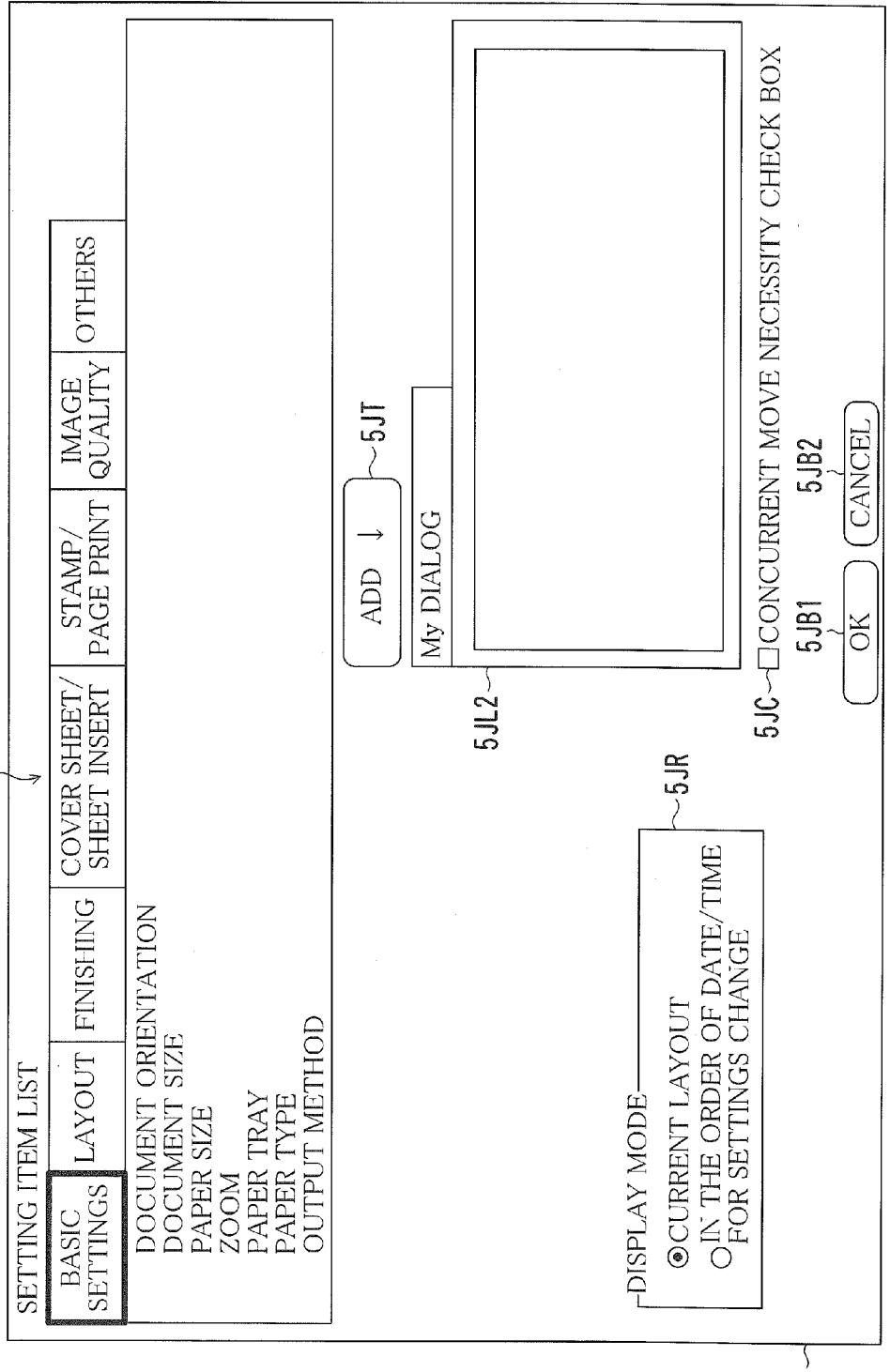
FIG. 31 is a diagram showing an example as to how a setting item designation screen is displayed.
Figure 32:
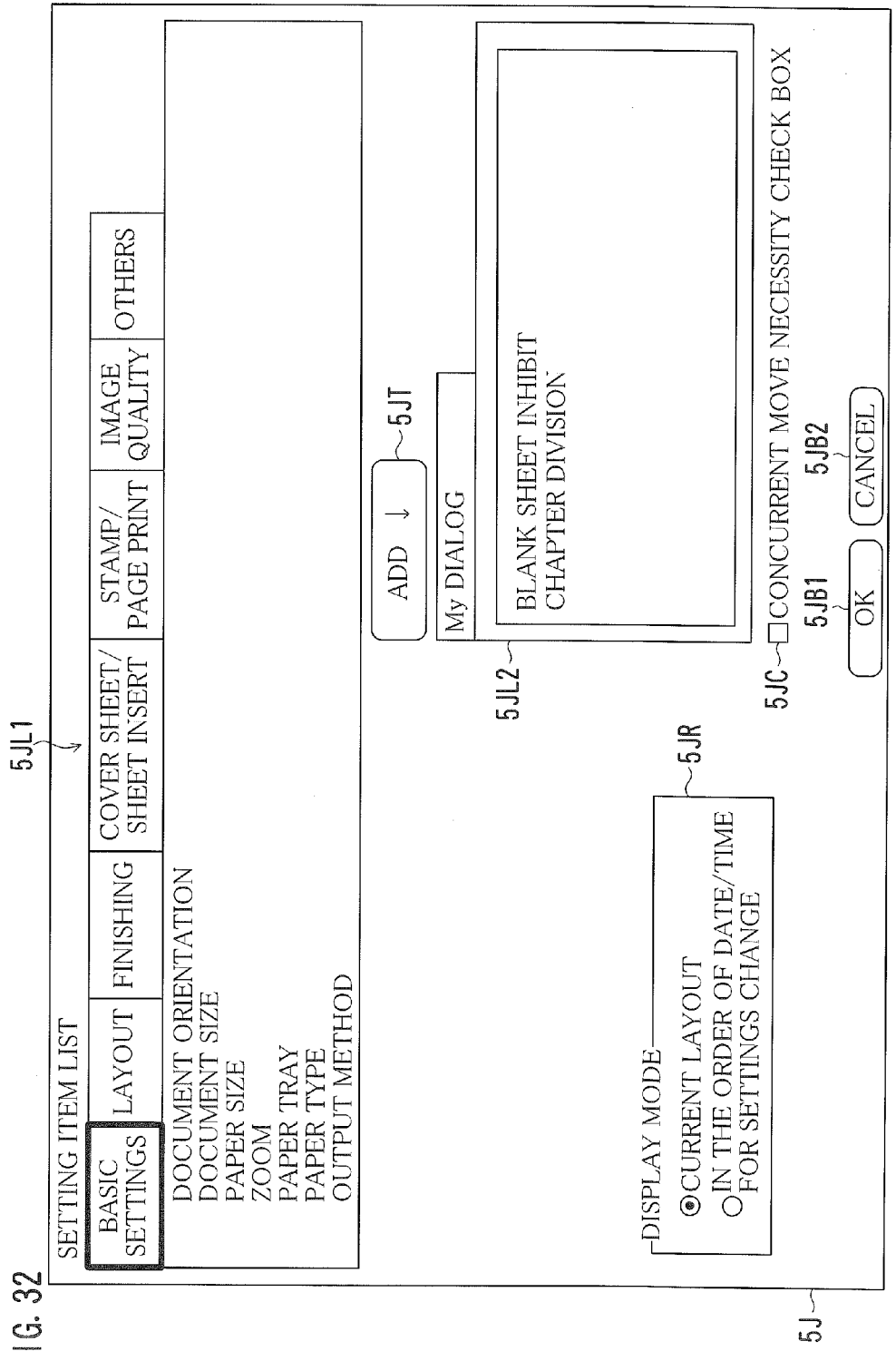
FIG. 32 is a diagram showing an example of a state of a setting item designation screen after a small group is generated.

FIG. 28 is a diagram showing an example of the configuration of the third dialog box edit processing portion 206. FIGS. 29 and 30 are flowcharts depicting an example of the flow of third edit processing. FIG. 31 is a diagram showing an example as to how a setting item designation screen 5J is displayed. FIG. 32 is a diagram showing an example of a state of the setting item designation screen 5J after a small group is generated.

In the second embodiment, the user selects, from among setting items of a custom group, a setting item to be added to a small group. In the third embodiment, it is possible to select a setting item to be added to a small group from among setting items which are not members of a custom group.

In the third embodiment, the processing is performed by the third dialog box edit processing portion 206. Hereinafter, the third dialog box edit processing portion 206 is described. Description of points common to the first or the second embodiment shall be omitted.

Referring to FIG. 28, the third dialog box edit processing portion 206 is configured of a setting item designation screen display processing portion 261, a conflict item detection portion 262, an addition necessity designation screen display processing portion 263, a setting item addition processing portion 264, and so on.

As with the first and second embodiments, the user is allowed to place the call object 4B to call the dialog box 5C of a small group in the left-side free region 5ARf1 or the right-side free region 5ARf2 of the conditions input screen 5A (see FIG. 5). Hereinafter, a case is described in which the call object 4B to call the dialog box 5C is placed in the left-side free region 5ARf1.

In the first embodiment, the user uses the dialog add button 5BD1, the hierarchy down button 5BV4, and so on in the configuration screen 5B (see FIG. 10). In the third embodiment, however, the user presses the direct add button 5BS2 after selecting the left-side member list 5BM1. In response to the direct add button 5BS2 pressed, the setting item designation screen display processing portion 261 through the setting item addition processing portion 264 perform processing according to the steps depicted in FIGS. 29 and 30.

The setting item designation screen display processing portion 261 displays the setting item designation screen 5J shown in FIG. 31 on the configuration screen 5B (Step #731 of FIG. 29). The setting item designation screen 5J is an example of an edit screen according to the present invention.

In the setting item designation screen 5J, there are provided a setting item list 5JL1, a combined target list 5JL2, an add button 5JT, a display mode selection button group 5JR, a concurrent move necessity check box 5JC, a completion button 5JB1, a cancel button 5JB2, and so on.

The setting item list 5JL1 has a list box and tabs of groups other than the custom group. Every time when a tab is selected, the setting item designation screen display processing portion 261 displays, in the list box, names of setting items of a group corresponding to the selected tab. The default arrangement order of the names of the setting items is the same as the arrangement order thereof in the conditions input screen 5A. The arrangement order is indicated in the screen layout data 6K on each group.

The combined target list 5JL2 shows names of setting items to be integrated into a small group. The combined target list 5JL2 shows nothing when the setting item designation screen 5J is displayed at first.

The display mode selection button group 5JR includes two radio buttons for changing the arrangement order of the setting items shown in the setting item list 5JL1. As default settings, a radio button for "current layout" is ON.

When the user turns a radio button for "in the order of date/time for settings change" ON, the setting item designation screen display processing portion 261 sorts the setting items in the setting item list 5JL1 in order from the newest date/time for settings change. The date/time for settings change is shown in the date/time data 6N (see FIG. 7).

After that, when the user turns the radio button for "current layout" ON, the setting item designation screen display processing portion 261 sorts again the setting items in accordance with the original order.

The user switches between the tabs of the setting item list 5JL1 or sorts the setting items appropriately by using the display mode selection button group 5JR to find out a setting item to be put into the small group. The user then selects the first setting item to press the add button 5JT.

As with the second embodiment, when the user intends to put, into the small group, the selected setting item and another setting item having a conflict with the selected setting item, he/she turns a concurrent move necessity check box 5JC ON in advance to press the add button 5JT.

When the first setting item is selected and the add button 5JT is pressed (Yes in Step #732), the setting item addition processing portion 264 performs processing on table data and object data. The processing is basically the same as that in the second embodiment. The processing is performed in the same manner as that in Step #713 through Step #715 of FIGS. 21 and 24.

To be specific, the setting item addition processing portion 264 generates screen layout data 6L on the dialog box 6C of the small group to store the screen layout data 6L into the screen layout data storage portion 232 (Step #733). The setting item addition processing portion 264 generates object data 6J on the call object 4B which is to call the dialog box 5C to store the object data 6J into the object data storage portion 231 (Step #734). The setting item addition processing portion 264 then adds an object code of the generated call object 4B to the left-side arrangement order table 6K1 (Step #735). It is to be noted that the position at which the object code is added is different from the case of the second embodiment. In the third embodiment, if the selected setting item is already a member of the custom group, then the object code of the call object 4B is added right above an object code of a settings object 4A for the selected setting item. Otherwise, the object code of the call object 4B is added to any position, e.g., the bottom of the left-side arrangement order table 6K1.

As with the conflict item detection portion 252 (see FIG. 20), the conflict item detection portion 262 detects another setting item having a conflict with the selected setting item (Step #736).

As with the addition necessity designation screen display processing portion 253, if the conflict item detection portion 262 detects such a setting item (Yes in Step #737), then the addition necessity designation screen display processing portion 263 displays the addition necessity designation screen 5H (see FIG. 26) on the liquid crystal display 20e (Step #739) as long as the concurrent move necessity check box 5GC is ON (Yes in Step #738).

As with the second embodiment, if the setting items having a conflict with each other may be put into the small group, then the user presses the approval button 5HB1.

In response to the approval button 5HB1 pressed (Yes in Step #740 of FIG. 30), the setting item designation screen display processing portion 261 adds both the selected setting item and the detected setting item to the combined target list 5JL2 as shown in FIG. 32 (Step #741). The setting item addition processing portion 264 adds, to the screen layout data 6L, the object code of the settings object 4A for the selected setting item. The setting item addition processing portion 264 deletes the object code if the left-side arrangement order table 6K1 indicates the object code thereof (Step #742). Further, as with the second embodiment, the setting item designation screen display processing portion 261 adds, to the screen layout data 6L, the object code of the settings object 4A for the detected setting item, and deletes the object code thereof if the left-side arrangement order table 6K1 indicates the object code (Step #743).

On the other hand, if the conflict item detection portion 262 does not detect such a setting item (No in Step #737), further, if the concurrent move necessity check box 5GC is OFF (No in Step #738), and further, if the disapproval button 5HB2 is pressed (No in Step #740), then the setting item designation screen display processing portion 261 adds only the selected setting item to the combined target list 5JL2 (Step #744). The setting item addition processing portion 264 adds, to the screen layout data 6L, the object code of the settings object 4A for the selected setting item, and deletes the object code thereof from the left-side arrangement order table 6K1 (Step #745).

In order to further add a setting item to the small group, the user preferably selects the setting item from the setting item list 5JL1 to press the add button 5JT.

In response to the operation by the user (No in Step #732), the setting item designation screen display processing portion 261, the conflict item detection portion 262, and the setting item addition processing portion 264 perform the foregoing processing basically. However, the processing from Step #733 through Step #735 is bypassed.

After finishing adding the setting item to the small group, the user presses the completion button 5JB1. In response to the completion button 5JB1 pressed (Yes in Step #746), the configuration screen display processing portion 202 closes the setting item designation screen 5J, updates the state of the left-side member list 5BM1 in accordance with the generation of the small group and addition of the call object 4B, and displays the configuration screen 5B (Step #747).

In what way the dialog box 5C is edited in the third embodiment is described above. When finishing editing the dialog box 5C, the user presses the completion button 5BF. In response to the completion button 5BF pressed, the conditions input screen display processing portion 201 closes the configuration screen 5B to display the conditions input screen 5A based on the updated left-side arrangement order table 6K1.

On the setting item designation screen 5J (see FIG. 31), the user can directly select, from among the setting items grouped in the tabs 5AT of the conditions input screen 5A (see FIG. 5), a candidate setting item to be put into a small group. Therefore, the user can perform operation more instantly as compared to the case where the configuration screen 5B and the moving member designation screen 5G are used.

Figure 33:
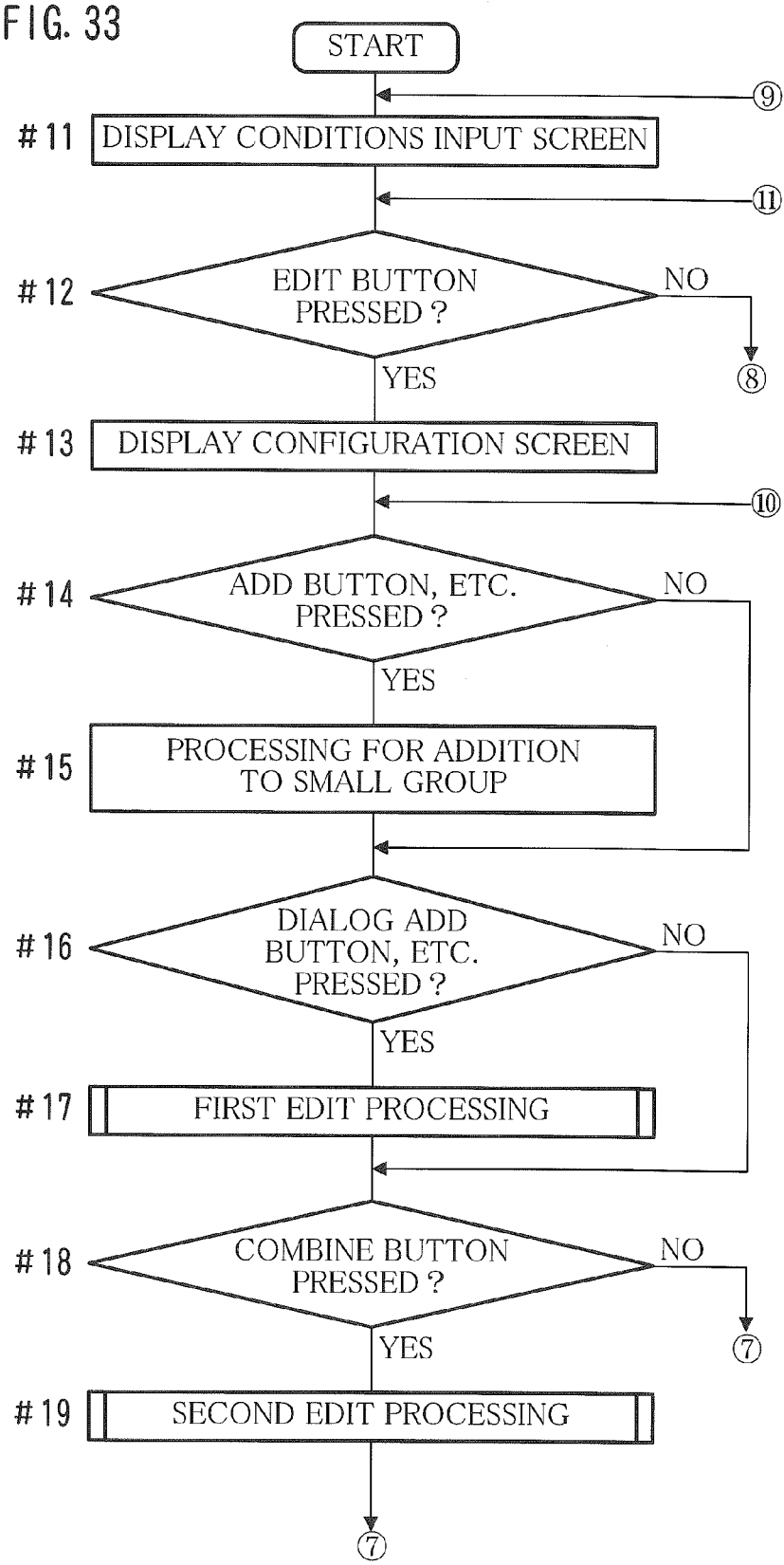
FIG. 33 is a flowchart depicting an example of the flow of the entire processing performed by a printer driver.
Figure 34:
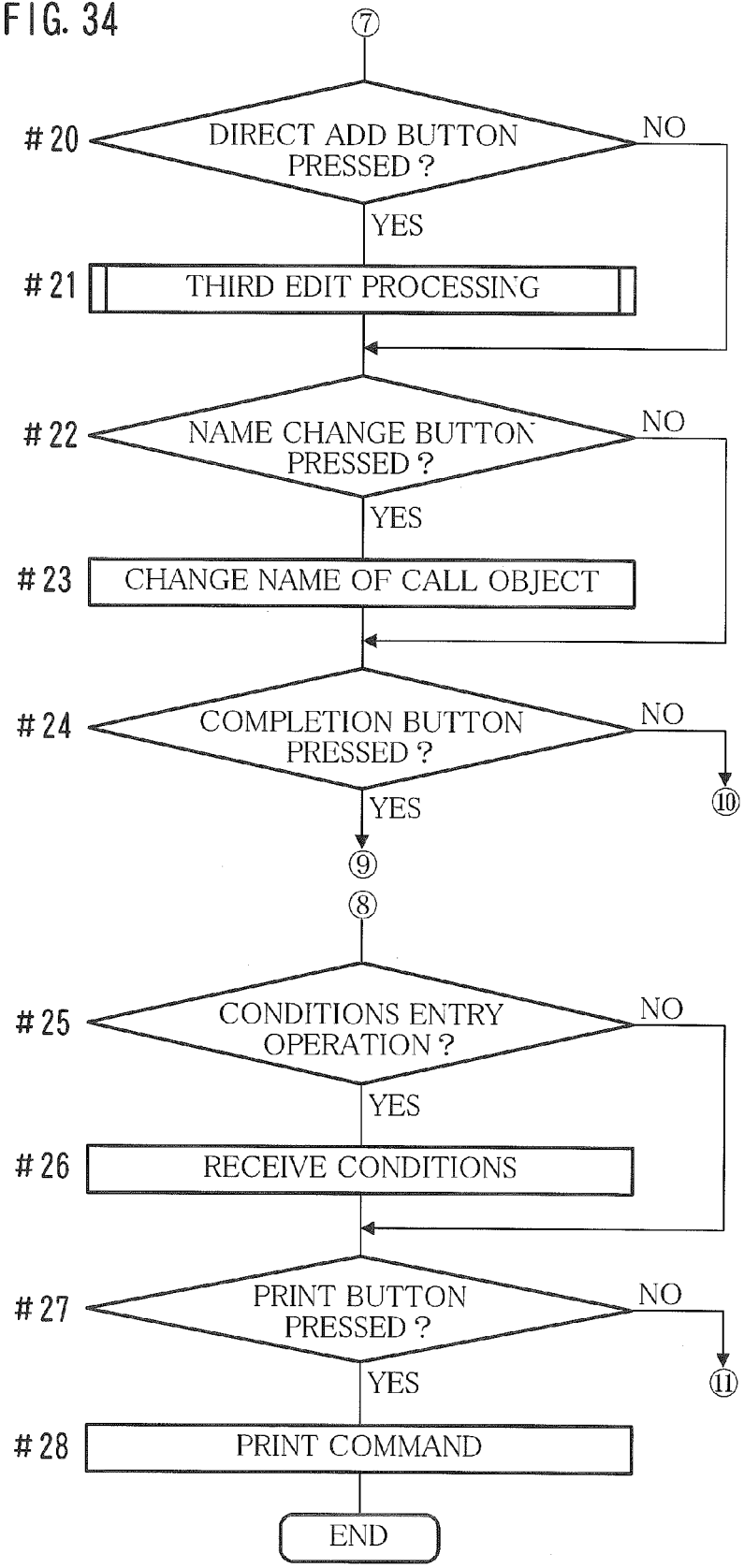
FIG. 34 is a flowchart depicting an example of the flow of the entire processing performed by a printer driver.

FIGS. 33 and 34 are flowcharts depicting an example of the flow of the entire processing performed by the printer driver 2PD.

The description goes on to the entire processing by the terminal 2 and the entire operation by a user with reference to the flowcharts of FIGS. 33 and 34.

The user prepares, in the terminal 2, data on a document to be printed, and enters a predetermined command.

In response to the predetermined command, the terminal 2 displays the conditions input screen 5A as shown in FIG. 5 (Step #11 of FIG. 33). The user is allowed to designate, on the conditions input screen 5A, conditions under which the document is to be printed.

The user is allowed to select one or more of the setting items arbitrarily, and to group the selected setting items into a custom group to place the custom group on the conditions designation region 5AR. In short, the user is allowed to create or edit the custom group of his/her own. In order to perform the operation for the custom group, the user presses the edit button 5ARe.

In response to the edit button 5ARe pressed (Yes in Step #12), the terminal 2 displays the configuration screen 5B as shown in FIG. 10 (Step #13).

The user is allowed to edit the custom group by using the various objects on the configuration screen 5B.

The addition of a setting item to the custom group, the deletion of a setting item from the custom group, the change in arrangement from side to side, and the change in arrangement up and down are described earlier in (1)-(4). To be specific, when the user presses the left-side object add button 5BA1, the right-side object add button 5BA2, the up arrow button 5BV1, the down arrow button 5BV2, the right/left arrow button 5BV3, or the delete button 5BV6 (Yes in Step #14), the terminal 2 performs processing appropriately, depending on which of the buttons is pressed, in the manner as described in (1)-(4) (Step #15).

The user is also allowed to classify setting items that are members of a custom group into a small group. As discussed above, there are three methods for such grouping.

According to the first embodiment, the user operates the dialog add button 5BD1, the hierarchy down button 5BV4, and so on. In response to the operation by the user (Yes in Step #16), the terminal 2 performs processing for editing the small group and processing for setting the dialog box 5C in the steps depicted in FIG. 13 (Step #17).

According to the second embodiment, the user presses the combine button 5BS1. In response to the combine button 5BS1 pressed (Yes in Step #18), the terminal 2 performs processing for editing the small group and processing for setting the dialog box 5C in the steps depicted in FIGS. 21 and 22 (Step #19).

According to the third embodiment, the user presses the direct add button 5BS2. In response to the direct add button 5BS2 pressed (Yes in Step #20 of FIG. 34), the terminal 2 performs processing for editing the small group and processing for setting the dialog box 5C in the steps depicted in FIGS. 29 and 30 (Step #21).

The user is allowed to change the name of an object to open the dialog box 5C for the small group, i.e., the name of the call object 4B. In such a case, the user presses the name change button 5BN.

In response to the name change button 5BN pressed (Yes in Step #22), the terminal 2 displays the name change screen 5D as shown in FIG. 16 to change the name of the call object 4B to a name entered by the user (Step #23).

The user performs the foregoing processing appropriately. When finishing editing the small group, the user presses the completion button 5BF.

In response to the completion button 5BF pressed (Yes in Step #24), the terminal 2 closes the configuration screen 5B, and displays the conditions input screen 5A which has been customized depending on the edit on the small group (Step #11).

The user enters, into the conditions input screen 5A, conditions under which the document is to be printed and conditions under which a finish is to be applied to a printed matter. In response to the entry (No in Step #12 and Yes in Step #25), the terminal 2 receives the conditions (Step #26).

After finishing entering the conditions, the user presses the print button 5AK. In response to the print button 5AK pressed (Yes in Step #27), the terminal 2 generates print job data by using the received conditions and the data on the prepared document, and sends, to the image forming apparatus 1, the print job data together with the print command (Step #28).

The image forming apparatus 1 detects, only in the second and third embodiments, a setting item having a conflict with another setting item selected by the user. Such a detection may be also made in the first embodiment. The selected setting item may be classified into a small group together with the detected setting item.

The case is described in which setting items for print conditions and setting items for printed matter finish conditions are handled. The present invention is also applicable to a case where setting items for other conditions are handled. For example, the present invention is also applicable to a case where setting items for scan conditions or setting items for facsimile transmission conditions are handled.

The screen layout data storage portion 232 may store, as one file, screen layout data 6K on a custom group and screen layout data 6L on a subordinate group, namely, small group. Further, the file may contain screen layout data 6M on a subordinate group of the small group, namely, a second small group.

In the foregoing embodiments, the image forming apparatus 1 distinguish a name of a setting item of a small group from a name of a setting item not belonging to the small group by adding an indent thereto as shown in FIG. 12. Instead of this however, another method may be used to distinguish between the names. For example, it is possible to set the font size of the name of the setting item of the small group to be smaller than the font size of the name of the setting item not belonging to the small group.

In the foregoing embodiments, the terminal 2 displays and customizes the conditions input screen 5A for processing performed by the image forming apparatus 1. Instead of this, however, the image forming apparatus 1 may display and customize the conditions input screen 5A. According to the first through third embodiments, it is possible to display an object for a setting item arbitrarily selected by a user more clearly than with conventionally possible.

It is to be understood that the overall configuration of the terminal 2, the constituent elements thereof, the content and order of the processing, the configuration of data, and the like can be appropriately modified without departing from the spirit of the present invention.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A settings object display control device for displaying, on a display unit, objects for setting print conditions of a printer driver provided on an item by item of corresponding printing condition to be set for processing on an image forming apparatus and used for a user to set print conditions for the item, the device comprising:
    a storage portion configured to store member data therein, the member data indicating, among the objects, specific objects belonging to a custom group whose member is selectable arbitrarily by the user, and indicating, among the specific objects, child specific objects belonging to a subordinate group lower than the custom group;
    a hardware processor configured to:
        create a call object for calling the child specific object;
        update, when any one of the specific objects is designated and when predetermined operation is performed, the member data in such a manner that the specific object designated belongs to the subordinate group corresponding to the call object, and update, when any one of the child specific objects is designated and when predetermined operation is performed, the member data in such a manner that the child specific object designated is withdrawn from the subordinate group corresponding to the call object; and
        display, on the display unit, a first setting screen of the printer driver in which, among the specific objects, a specific object not belonging to the subordinate group, and the call object are provided based on the member data, and display, on the display unit, when operation is made on the call object, a second setting screen of the printer driver in which the child specific objects belonging to the subordinate group corresponding to the call object are provided based on the member data.

2. The settings object display control device according to claim 1, comprising an edit screen display control portion configured to display, on the display unit, an edit screen in which a list showing names of the specific objects and names of the child specific objects in distinct selectable ways, a first edit object and a second edit object used for editing are provided; wherein
    the update portion updates, when any one of the specific objects is selected from the list and when the first edit object is operated, the member data in such a manner that the specific object selected belongs to the subordinate group, and configured to update, when any one of the child specific objects is selected from the list and when the second edit object is operated, the member data in such a manner that the child specific object selected is withdrawn from the subordinate group.

3. The settings object display control device according to claim 1, comprising an edit screen display control portion configured to display, on the display unit, an edit screen in which a list showing names of the specific objects and an edit object are provided; wherein
    the update portion updates, when any one of the specific objects is selected from the list and when the edit object is operated, the member data in such a manner that the specific object selected belongs to the subordinate group.

4. The settings object display control device according to claim 3, wherein the edit screen display control portion displays the edit screen in which, as the list, a list showing names of the specific objects in order of date/time at which the specific objects belong to the custom group, or, in order of date/time at which the specific objects are used for settings.

5. The settings object display control device according to claim 1, comprising an edit screen display control portion configured to display, on the display unit, an edit screen in which a list showing names of the objects and an edit object are provided; wherein the update portion updates, when any one of the objects is selected from the list and when the edit object is operated, the member data in such a manner that the object selected belongs to the subordinate group.

6. The settings object display control device according to claim 5, wherein the edit screen display control portion displays the edit screen in which, as the list, a list showing names of the objects in order of date/time at which at which the objects are used for settings.

7. The settings object display control device according to claim 1, wherein
    when any one of the child specific objects is selected by the user and when predetermined operation is performed, the update portion updates the member data in such a manner that the child specific object selected is shown as a grandchild specific object, and
    the setting screen display control portion displays the second setting screen in which a second call object is provided together with the child specific object, and when the call object is operated, the setting screen display control portion displays a third setting screen in which the grandchild specific object is provided.

8. A settings object display method for displaying objects for setting print conditions of a printer driver provided on an item by item of corresponding printing condition to be set for processing on an image forming apparatus and used for a user to set print conditions for the item, the method comprising:
    storing member data in a storage portion in advance, the member data indicating, among the objects, specific objects belonging to a custom group whose member is selectable arbitrarily by the user, and indicating, among the specific objects, child specific objects belonging to a subordinate group lower than the custom group;
    creating a call object for calling the child specific object;
    updating, when any one of the specific objects is designated and when predetermined operation is performed, the member data in such a manner that the specific object designated belongs to the subordinate group corresponding to the call object, and updating, when any one of the child specific objects is designated and when predetermined operation is performed, the member data in such a manner that the child specific object designated is withdrawn from the subordinate group corresponding to the call object; and displaying a first setting screen of the printer driver in which, among the specific objects, a specific object not belonging to the subordinate group, and the call object are provided based on the member data, and displaying, when operation is made on the call object, a second setting screen of the printer driver in which the child specific objects belonging to the subordinate group corresponding to the call object are provided based on the member data.

9. The method according to claim 8, further comprising displaying an edit screen in which a list showing names of the specific objects and names of the child specific objects in distinct selectable ways, a first edit object and a second edit object used for editing are provided; and updating, when any one of the specific objects is selected from the list and when the first edit object is operated, the member data in such a manner that the specific object selected belongs to the subordinate group, and configured to update, when any one of the child specific objects is selected from the list and when the second edit object is operated, the member data in such a manner that the child specific object selected is withdrawn from the subordinate group.

10. The method according to claim 8, further comprising an edit screen in which a list showing names of the specific objects and an edit object are provided; and updating, when any one of the specific objects is selected from the list and when the edit object is operated, the member data in such a manner that the specific object selected belongs to the subordinate group.

11. The method according to claim 10, further comprising displaying the edit screen in which, as the list, a list showing names of the specific objects in order of date/time at which the specific objects belong to the custom group, or, in order of date/time at which the specific objects are used for settings.

12. The method according to claim 8, further comprising displaying an edit screen in which a list showing names of the objects and an edit object are provided; wherein the update portion updates, when any one of the objects is selected from the list and when the edit object is operated, the member data in such a manner that the object selected belongs to the subordinate group.

13. The method according to claim 12, further comprising displaying the edit screen in which, as the list, a list showing names of the objects in order of date/time at which at which the objects are used for settings.

14. The method according to claim 8, further comprising when any one of the child specific objects is selected by the user and when predetermined operation is performed, updating the member data in such a manner that the child specific object selected is shown as a grandchild specific object, and displaying the second setting screen in which a second call object is provided together with the child specific object, and when the call object is operated, displaying a third setting screen in which the grandchild specific object is provided.

15. A non-transitory computer-readable storage medium storing thereon a computer program used in a computer for displaying, on a display unit, objects for setting print conditions of a printer driver provided on an item by item of corresponding printing condition to be set for processing on an image forming apparatus and used for a user to set print conditions for the item, and having a storage portion for storing member data therein, the member data indicating, among the objects, specific objects belonging to a custom group whose member is selectable arbitrarily by the user, and indicating, among the specific objects, child specific objects belonging to a subordinate group lower than the custom group, the computer program causing the computer to perform processing comprising:

creating a call object for calling the child specific object;

updating, when any one of the specific objects is designated and when predetermined operation is performed, the member data in such a manner that the specific object designated belongs to the subordinate group corresponding to the call object;

updating, when any one of the child specific objects is designated and when predetermined operation is performed, the member data in such a manner that the child specific object designated is withdrawn from the subordinate group corresponding to the call object;

displaying, on the display unit, a first setting screen of the printer driver in which, among the specific objects, the specific object not belonging to the subordinate group; and displaying, on the display unit, when operation is made on the call object, a second setting screen of the printer driver in which the child specific objects belonging to the subordinate group corresponding to the call object are provided based on the member data.

16. The non-transitory computer-readable storage medium according to claim 15, further comprising displaying an edit screen in which a list showing names of the specific objects and names of the child specific objects in distinct selectable ways, a first edit object and a second edit object used for editing are provided; and updating, when any one of the specific objects is selected from the list and when the first edit object is operated, the member data in such a manner that the specific object selected belongs to the subordinate group, and configured to update, when any one of the child specific objects is selected from the list and when the second edit object is operated, the member data in such a manner that the child specific object selected is withdrawn from the subordinate group.

17. The non-transitory computer-readable storage medium according to claim 15, further comprising displaying an edit screen in which a list showing names of the specific objects and an edit object are provided; wherein updating, when any one of the specific objects is selected from the list and when the edit object is operated, the member data in such a manner that the specific object selected belongs to the subordinate group.

18. The non-transitory computer-readable storage medium according to claim 17, further comprising displaying the edit screen in which, as the list, a list showing names of the specific objects in order of date/time at which the specific objects belong to the custom group, or, in order of date/time at which the specific objects are used for settings.

19. The non-transitory computer-readable storage medium according to claim 15, further comprising displaying an edit screen in which a list showing names of the objects and an edit object are provided; wherein the update portion updates, when any one of the objects is selected from the list and when the edit object is operated, the member data in such a manner that the object selected belongs to the subordinate group.

20. The non-transitory computer-readable storage medium according to claim 19, further comprising displaying the edit screen in which, as the list, a list showing names of the objects in order of date/time at which at which the objects are used for settings.

21. The non-transitory computer-readable storage medium according to claim 15, further comprising
- when any one of the child specific objects is selected by the user and when predetermined operation is performed, updating the member data in such a manner that the child specific object selected is shown as a grandchild specific object, and
- displaying the second setting screen in which a second call object is provided together with the child specific object, and when the call object is operated, displaying a third setting screen in which the grandchild specific object is provided.

* * * * *